US010919110B2

(12) United States Patent
Yamauchi

(10) Patent No.: US 10,919,110 B2
(45) Date of Patent: Feb. 16, 2021

(54) DATA GENERATING DEVICE SETTING MACHINING CONDITION SUITABLE FOR FOIL PLACED ON WORKPIECE TO BE MACHINED BY IRRADIATING LASER BEAM THEREON

(71) Applicant: BROTHER KOGYO KABUSHIKI KAISHA, Nagoya (JP)

(72) Inventor: Shinya Yamauchi, Toyohashi (JP)

(73) Assignee: BROTHER KOGYO KABUSHIKI KAISHA, Aichi (JP)

( * ) Notice: Subject to any disclaimer, the term of this patent is extended or adjusted under 35 U.S.C. 154(b) by 428 days.

(21) Appl. No.: 15/895,614

(22) Filed: Feb. 13, 2018

(65) Prior Publication Data

US 2018/0178318 A1    Jun. 28, 2018

Related U.S. Application Data

(63) Continuation of application No. PCT/JP2016/077967, filed on Sep. 23, 2016.

(30) Foreign Application Priority Data

Sep. 24, 2015 (JP) .............................. JP2015-186663

(51) Int. Cl.
*B23K 26/00* (2014.01)
*B41M 5/26* (2006.01)
*B41M 5/24* (2006.01)

(52) U.S. Cl.
CPC ............. *B23K 26/00* (2013.01); *B41M 5/262* (2013.01); *B41M 5/24* (2013.01)

(58) Field of Classification Search
CPC .......... B23K 26/00; B41M 5/24; B41M 5/262
(Continued)

(56) References Cited

U.S. PATENT DOCUMENTS 6,075,223 A * 6/2000 Harrison ................ B41M 5/262
219/121.85
6,132,818 A * 10/2000 Tanaka ............... B41M 5/38207
427/596

(Continued)

FOREIGN PATENT DOCUMENTS

JP   H06-8634 A   1/1994
JP   H11-77340 A  3/1999
(Continued)

OTHER PUBLICATIONS

International Preliminary Report on Patentability issued in connection with International Patent Application No. PCT/JP2016/077967, dated Mar. 27, 2018. (5 pages).

(Continued)

*Primary Examiner* — Dana Ross
*Assistant Examiner* — Joseph W Iskra
(74) *Attorney, Agent, or Firm* — K&L Gates LLP

(57) ABSTRACT

A data generating device includes: a storage; and a controller. The storage is configured to store a plurality of sets of machining condition information in association with respective ones of a plurality of sets of foil information. Each of the plurality of sets of machining condition information specifies a machining condition on irradiation of a laser beam from a laser machining device onto a surface of a workpiece on which a metal foil is placed. Each of the plurality of sets of foil information specifies composition of the foil. The controller is configured to perform: receiving input information specifying composition of a target foil to be subjected to the irradiation of the laser beam as one set of foil information; and identifying one set of machining condition information corresponding to the one set of foil information from the plurality of sets of machining condition information stored in the storage.

16 Claims, 11 Drawing Sheets

(58) Field of Classification Search
USPC .................................................. 219/121.6
See application file for complete search history.

(56) References Cited

U.S. PATENT DOCUMENTS

| | | | | |
|---|---|---|---|---|
| 6,852,948 | B1* | 2/2005 | Harrison | B41M 5/262 |
| | | | | 219/121.85 |
| 7,099,533 | B1* | 8/2006 | Chenard | G02B 6/4296 |
| | | | | 372/103 |
| 2003/0071020 | A1* | 4/2003 | Hong | B23K 26/361 |
| | | | | 219/121.69 |
| 2006/0270232 | A1* | 11/2006 | Kawamura | B23K 26/382 |
| | | | | 438/690 |
| 2007/0040115 | A1* | 2/2007 | Publicover | G01T 1/29 |
| | | | | 250/305 |
| 2010/0227133 | A1* | 9/2010 | Liu | C23C 14/3435 |
| | | | | 428/209 |

FOREIGN PATENT DOCUMENTS

| | | |
|---|---|---|
| JP | 2001-518410 A | 10/2001 |
| JP | 2003-181659 A | 7/2003 |
| JP | 2006-095941 A | 4/2006 |
| JP | 2008-044002 A | 2/2008 |
| JP | 2012-519077 A | 8/2012 |
| JP | 2014-172087 A | 9/2014 |

OTHER PUBLICATIONS

Japan Patent Office, International Search Report for PCT Appln. No. PCT/JP2016/077967 (related to above-captioned patent application), dated Nov. 1, 2016.

Japan Patent Office, Written Opinion for PCT Appln. No. PCT/JP2016/077967 (related to above-captioned patent application), dated Nov. 1, 2016.

* cited by examiner

FIG. 4A
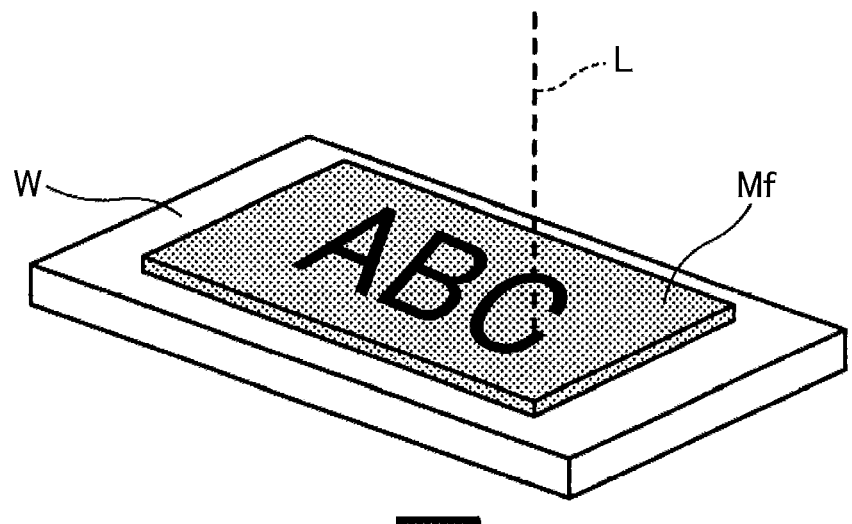
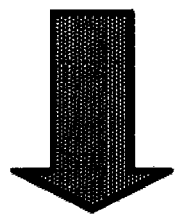
FIG. 4B
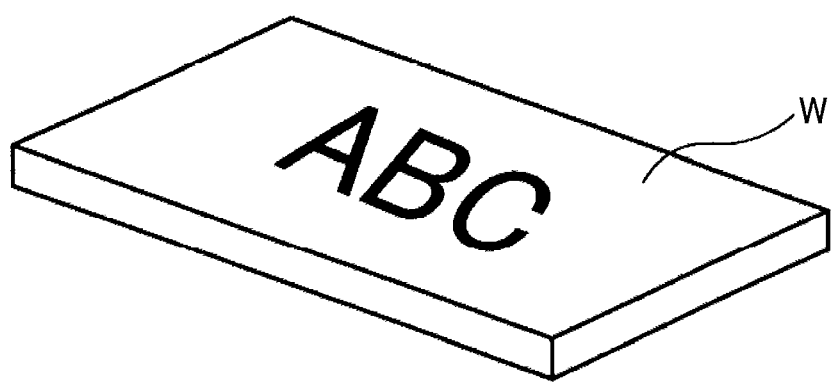

FIG. 7

| MATERIAL OF FOIL [ABSORPTIVITY] | THICKNESS OF FOIL | MACHINING QUALITY | OUTPUT INTENSITY | SCANNING SPEED | SCANNING NUMBER | ... |
|---|---|---|---|---|---|---|
| MATERIAL(A)[LOW] | THIN(~5μm) | FINE | 5.0(W) | 10(mm/s) | 2(TIMES) | ... |
| MATERIAL(A)[LOW] | THIN(~5μm) | BALANCED | 5.0(W) | 100(mm/s) | 2(TIMES) | ... |
| MATERIAL(A)[LOW] | THIN(~5μm) | FAST | 5.0(W) | 200(mm/s) | 2(TIMES) | ... |
| MATERIAL(A)[LOW] | MEDIUM(5~15μm) | FINE | 10.0(W) | 10(mm/s) | 4(TIMES) | ... |
| MATERIAL(A)[LOW] | MEDIUM(5~15μm) | BALANCED | 10.0(W) | 100(mm/s) | 4(TIMES) | ... |
| MATERIAL(A)[LOW] | MEDIUM(5~15μm) | FAST | 10.0(W) | 200(mm/s) | 4(TIMES) | ... |
| MATERIAL(A)[LOW] | THICK(15μm~) | FINE | 15.0(W) | 10(mm/s) | 5(TIMES) | ... |
| MATERIAL(A)[LOW] | THICK(15μm~) | BALANCED | 15.0(W) | 100(mm/s) | 5(TIMES) | ... |
| MATERIAL(A)[LOW] | THICK(15μm~) | FAST | 15.0(W) | 200(mm/s) | 5(TIMES) | ... |
| MATERIAL(B)[MODERATE] | THIN(~5μm) | FINE | 2.0(W) | 50(mm/s) | 1(TIME) | ... |
| MATERIAL(B)[MODERATE] | THIN(~5μm) | BALANCED | 2.0(W) | 250(mm/s) | 1(TIME) | ... |
| MATERIAL(B)[MODERATE] | THIN(~5μm) | FAST | 2.0(W) | 500(mm/s) | 1(TIME) | ... |
| MATERIAL(B)[MODERATE] | MEDIUM(5~15μm) | FINE | 3.5(W) | 50(mm/s) | 2(TIMES) | ... |
| MATERIAL(B)[MODERATE] | MEDIUM(5~15μm) | BALANCED | 3.5(W) | 250(mm/s) | 2(TIMES) | ... |
| MATERIAL(B)[MODERATE] | MEDIUM(5~15μm) | FAST | 3.5(W) | 500(mm/s) | 2(TIMES) | ... |
| MATERIAL(B)[MODERATE] | THICK(15μm~) | FINE | 5.0(W) | 50(mm/s) | 3(TIMES) | ... |
| MATERIAL(B)[MODERATE] | THICK(15μm~) | BALANCED | 5.0(W) | 250(mm/s) | 3(TIMES) | ... |
| MATERIAL(B)[MODERATE] | THICK(15μm~) | FAST | 5.0(W) | 500(mm/s) | 3(TIMES) | ... |
| MATERIAL(C)[HIGH] | THIN(~5μm) | FINE | 0.5(W) | 200(mm/s) | 1(TIME) | ... |
| MATERIAL(C)[HIGH] | THIN(~5μm) | BALANCED | 0.5(W) | 500(mm/s) | 1(TIME) | ... |
| MATERIAL(C)[HIGH] | THIN(~5μm) | FAST | 0.5(W) | 1000(mm/s) | 1(TIME) | ... |
| MATERIAL(C)[HIGH] | MEDIUM(5~15μm) | FINE | 1.0(W) | 200(mm/s) | 2(TIMES) | ... |
| MATERIAL(C)[HIGH] | MEDIUM(5~15μm) | BALANCED | 1.0(W) | 500(mm/s) | 2(TIMES) | ... |
| MATERIAL(C)[HIGH] | MEDIUM(5~15μm) | FAST | 1.0(W) | 1000(mm/s) | 2(TIMES) | ... |
| MATERIAL(C)[HIGH] | THICK(15μm~) | FINE | 2.0(W) | 200(mm/s) | 3(TIMES) | ... |
| MATERIAL(C)[HIGH] | THICK(15μm~) | BALANCED | 2.0(W) | 500(mm/s) | 3(TIMES) | ... |
| MATERIAL(C)[HIGH] | THICK(15μm~) | FAST | 2.0(W) | 1000(mm/s) | 3(TIMES) | ... |
| ... | | | ... | | ... | |

FIG. 8

| OUTPUT INTENSITY(W) | 12 | 8 | 5 | 4 | 3 | 2 |
|---|---|---|---|---|---|---|
| MACHINING RESULT | 123 | 123 | 123 | 123 | ↓ | ↓ |
| VISUAL EVALUATION | ○ | ○ | ○ | △ | △ | × |

FIG. 9A

| EXPERIMENTAL MARKING CONDITION | |
|---|---|
| SCANNING SPEED (mm/s) | 50 |
| SCANNING NUMBER (TIMES) | 2 |

| OUTPUT INTENSITY (W) | 20 | 12 | 8 | 4.6 | 4 | 3 | 2 |
|---|---|---|---|---|---|---|---|
| VISUAL EVALUATION | ○ | ○ | ○ | ○ | △ | △ | × |

FIG. 9B

| EXPERIMENTAL MARKING CONDITION | |
|---|---|
| OUTPUT INTENSITY (W) | 5 |
| SCANNING NUMBER (TIMES) | 2 |

| SCANNING SPEED (mm/s) | 10 | 20 | 40 | 80 | 100 | 200 | 400 |
|---|---|---|---|---|---|---|---|
| VISUAL EVALUATION | ○ | ○ | ○ | ○ | ○ | ○ | × |

FIG. 9C

| EXPERIMENTAL MARKING CONDITION | |
|---|---|
| OUTPUT INTENSITY (W) | 5 |
| SCANNING SPEED (mm/s) | 50 |

| SCANNING NUMBER (TIMES) | 1 | 2 | 3 | 4 | 5 | 6 | 7 |
|---|---|---|---|---|---|---|---|
| VISUAL EVALUATION | △ | ○ | ○ | ○ | ○ | △ | × |

FIG. 10A

| EXPERIMENTAL MARKING CONDITION | |
|---|---|
| SCANNING SPEED (mm/s) | 50 |
| SCANNING NUMBER (TIMES) | 2 |

| OUTPUT INTENSITY (W) | 10 | 5 | 4 | 3 | 2 | 1 |
|---|---|---|---|---|---|---|
| VISUAL EVALUATION | × | ○ | ○ | ○ | ○ | △ |

FIG. 10B

| EXPERIMENTAL MARKING CONDITION | |
|---|---|
| OUTPUT INTENSITY (W) | 4 |
| SCANNING NUMBER (TIMES) | 2 |

| SCANNING SPEED (mm/s) | 20 | 50 | 100 | 200 | 300 | 500 | 700 |
|---|---|---|---|---|---|---|---|
| VISUAL EVALUATION | △ | ○ | ○ | ○ | ○ | ○ | × |

FIG. 10C

| EXPERIMENTAL MARKING CONDITION | |
|---|---|
| OUTPUT INTENSITY (W) | 4 |
| SCANNING SPEED (mm/s) | 50 |

| SCANNING NUMBER (TIMES) | 1 | 2 | 3 | 4 | 5 |
|---|---|---|---|---|---|
| VISUAL EVALUATION | ○ | ○ | ○ | △ | × |

FIG. 11A

| EXPERIMENTAL MARKING CONDITION | |
|---|---|
| SCANNING SPEED (mm/s) | 1000 |
| SCANNING NUMBER (TIMES) | 1 |

| OUTPUT INTENSITY (W) | 5 | 4 | 3 | 2 | 1 | 0.5 |
|---|---|---|---|---|---|---|
| VISUAL EVALUATION | × | × | × | ○ | ○ | ○ |

FIG. 11B

| EXPERIMENTAL MARKING CONDITION | |
|---|---|
| OUTPUT INTENSITY (W) | 1 |
| SCANNING NUMBER (TIMES) | 1 |

| SCANNING SPEED (mm/s) | 50 | 100 | 200 | 500 | 1000 | 1500 | 2000 |
|---|---|---|---|---|---|---|---|
| VISUAL EVALUATION | × | ○ | ○ | ○ | ○ | △ | × |

FIG. 11C

| EXPERIMENTAL MARKING CONDITION | |
|---|---|
| OUTPUT INTENSITY (W) | 1 |
| SCANNING SPEED (mm/s) | 1000 |

| SCANNING NUMBER (TIMES) | 1 | 2 | 3 | 4 |
|---|---|---|---|---|
| VISUAL EVALUATION | ○ | ○ | ○ | × |

DATA GENERATING DEVICE SETTING MACHINING CONDITION SUITABLE FOR FOIL PLACED ON WORKPIECE TO BE MACHINED BY IRRADIATING LASER BEAM THEREON

CROSS REFERENCE TO RELATED APPLICATION

This application is a by-pass continuation of International Application No. PCT/JP2016/077967 filed Sep. 23, 2016 claiming priority from Japanese Patent Application No. 2015-186663 filed Sep. 24, 2015. The entire content of each of the priority application and the international application is incorporated herein by reference.

TECHNICAL FIELD

The present disclosure relates to a data generating device that generates machining data for controlling a laser machining device that machines a surface of a workpiece by irradiating a laser beam onto a metal foil placed on the surface of the workpiece.

BACKGROUND

Laser machining devices have conventionally been used to machine workpieces by irradiating a laser beam thereon. The laser machining device machines the workpiece by progressively scanning the irradiated laser beam at desired positions on the workpiece.

One method of machining with a laser machining device involves placing a metal foil on the surface of the workpiece. Next, the laser machining device irradiates the foil with a laser beam, alloying the foil with the surface of the workpiece to form desired markings thereon.

Japanese Patent Application Publication No. 2006-095941 discloses one such method of laser beam machining. In this method, a metal plate (corresponding to the foil in the present disclosure) having a thickness of approximately 100 μm is pressed against a workpiece as a mother alloy. Next, a laser beam is irradiated onto the metal plate so that the metal plate melts and combines with the mother alloy, thereby alloying the metal plate with the surface of the mother alloy. Thus, the alloyed portions of the mother alloy and metal plate form desired markings on the surface of the mother alloy in the conventional method described above.

SUMMARY

In the conventional marking process described above, machining quality is greatly affected by the composition of the foil placed on the surface of the workpiece and the machining conditions on the laser beam. Therefore, it is necessary to set machining conditions for the laser machining device that are suited to the composition of the foil and the like in order to ensure good machining quality in the conventional marking method described above.

While the conventional method allows for setting and modifying parameters related to the laser beam each time the type of metal plate is changed in order to modify the color of the markings, the user must manually set and adjust these parameters. Consequently, the user is forced to perform complex operations in order to set suitable machining conditions (i.e., parameters related to the laser beam).

In view of the foregoing, it is an object of the present disclosure to provide a data generating device capable of generating machining data used to simplify the setting of machining conditions for a laser machining device that are suitable for the composition of the metal foil placed on the surface of the workpiece.

In order to attain the above and other objects, the present disclosure provides a data generating device for generating machining data to control irradiation of a laser beam from a laser machining device onto a surface of a workpiece on which a metal foil is placed. The machining data includes a machining condition on the irradiation of the laser beam. The data generating device includes: a storage; and a controller. The storage is configured to store a plurality of sets of machining condition information in association with respective ones of a plurality of sets of foil information. Each of the plurality of sets of machining condition information specifying a machining condition on the irradiation of the laser beam. The machining condition includes at least one of output intensity of the laser beam, scanning speed of the laser beam, a scanning number of times of the laser beam, a frequency of the laser beam, and a pulse width of the laser beam. Each of the plurality of sets of foil information specifies composition of the foil. The composition of the foil includes material of the foil and a thickness of the foil. The controller is configured to perform: receiving input information specifying composition of a target foil to be subjected to the irradiation of the laser beam as one set of foil information; and identifying one set of machining condition information corresponding to the one set of foil information from the plurality of sets of machining condition information stored in the storage.

According to another aspect, the present disclosure provides a non-transitory computer readable storage medium storing a set of program instructions for a data generating device for generating machining data to control irradiation of a laser beam from a laser machining device onto a surface of a workpiece on which a metal foil is placed. The machining data includes a machining condition on the irradiation of the laser beam. The data generating device includes: a storage; and a controller. The storage is configured to store a plurality of sets of machining condition information in association with respective ones of a plurality of sets of foil information. Each of the plurality of sets of machining condition information specifies a machining condition on the irradiation of the laser beam. The machining condition includes at least one of output intensity of the laser beam, scanning speed of the laser beam, a scanning number of times of the laser beam, a frequency of the laser beam, and a pulse width of the laser beam. Each of the plurality of sets of foil information specifies composition of the foil. The composition of the foil includes material of the foil and a thickness of the foil. The set of program instructions, when executed by the controller, causes the data generating device to perform: receiving input information specifying composition of a target foil to be subjected to the irradiation of the laser beam as one set of foil information; and identifying one set of machining condition information corresponding to the one set of foil information from the plurality of sets of machining condition information stored in the storage.

According to still another aspect, the present disclosure provides a method executed by a data generating device for generating machining data to control irradiation of a laser beam from a laser machining device onto a surface of a workpiece on which a metal foil is placed. The machining data includes a machining condition on the irradiation of the laser beam. The data generating device includes: a storage; and a controller. The storage is configured to store a plurality of sets of machining condition information in association with respective ones of a plurality of sets of foil information. Each of the plurality of sets of machining condition information specifies a machining condition on the irradiation of the laser beam. The machining condition includes at least one of output intensity of the laser beam, scanning speed of the laser beam, a scanning number of times of the laser beam, a frequency of the laser beam, and a pulse width of the laser beam. Each of the plurality of sets of foil information specifying composition of the foil. The composition of the foil includes material of the foil and a thickness of the foil. The method includes: receiving input information specifying composition of a target foil to be subjected to the irradiation of the laser beam as one set of foil information; and identifying one set of machining condition information corresponding to the one set of foil information from the plurality of sets of machining condition information stored in the storage.

BRIEF DESCRIPTION OF THE DRAWINGS

The particular features and advantages of the disclosure as well as other objects will become apparent from the following description taken in connection with the accompanying drawings, in which:

FIGS. 4A and 4B are explanatory diagrams illustrating a ceramic marking process performed with the laser machining system according to the embodiment, in which FIG. 4A illustrates a marking step performed after completion of a foil placing step in the ceramic marking process, and FIG. 4B illustrates a foil removing step performed after completion of the marking step in the ceramic marking process;

FIG. 7 is an explanatory diagram showing an example of a recommended conditions database of the embodiment;

FIG. 8 is an explanatory diagram showing examples of machining results produced in ceramic marking processes and visual evaluations of the machining results;

FIGS. 9A through 9C are explanatory diagrams showing experimental results indicating effects of marking conditions on machining results of ceramic marking processes performed using a foil formed of low light-absorbing material, in which FIG. 9A illustrates effects of output intensity of pulsed laser on the machining results, FIG. 9B illustrates effects of scanning speed of the pulsed laser on the machining results, and FIG. 9C illustrates effects of a scanning number of times of the pulsed laser on the machining results;

FIGS. 10A through 10C are explanatory diagrams showing experimental results indicating effects of marking conditions on machining results of ceramic marking processes performed using a foil formed of moderate light-absorbing material, in which FIG. 10A illustrates effects of output intensity of pulsed laser on the machining results, FIG. 10B illustrates effects of scanning speed of the pulsed laser on the machining results, and FIG. 10C illustrates effects of a scanning number of times of the pulsed laser on the machining results; and FIGS. 11A through 11C are explanatory diagrams showing experimental results indicating effects of marking conditions on machining results of ceramic marking processes performed using a foil formed of high light-absorbing material, in which FIG. 11A illustrates effects of output intensity of pulsed laser on the machining results, FIG. 11B illustrates effects of scanning speed of the pulsed laser on the machining results, and FIG. 11C illustrates effects of a scanning number of times of the pulsed laser on the machining results.

DETAILED DESCRIPTION

Figure 1:
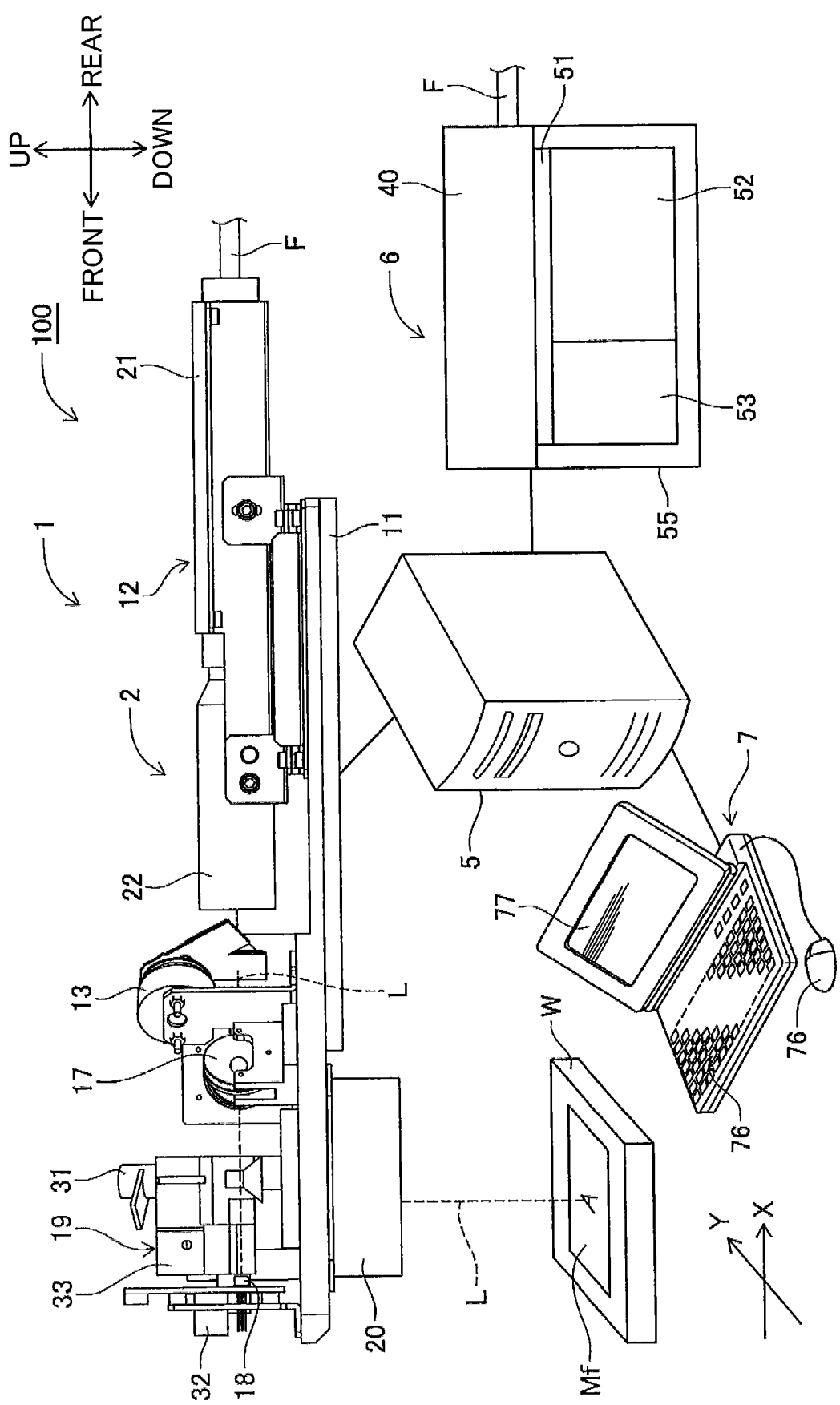
FIG. 1 is a schematic view of a laser machining system according to one embodiment of the present disclosure.

Next, an embodiment of a data generating device according to the present disclosure will be described while referring to the accompanying drawings. In a present embodiment, a data generating device 7 as an example of the data generating device of the present disclosure and a laser machining device 1 constitutes part of a laser machining system 100.

(Overall Structure of the Laser Machining System 100)

First, the overall structure of the laser machining system 100 according to the present embodiment will be described with reference to FIG. 1. The laser machining system 100 includes the laser machining device 1, and the data generating device 7 that corresponds to the data generating device of the present disclosure. The laser machining system 100 is configured to perform a marking process (including a ceramic marking process described later) by controlling the laser machining device 1 according to machining data generated by the data generating device 7 so that the laser machining device 1 scans a pulsed laser L two-dimensionally over the surface of a workpiece.

A marking process performed by the laser machining device 1 in the present embodiment denotes a process of drawing user-desired machining content on the surface of a workpiece W by irradiating the workpiece W with the pulsed laser L while scanning the pulsed laser L two-dimensionally over the surface of the workpiece W. The marking processes in the present embodiment include a normal marking process and a ceramic marking process described later. The normal marking process in the embodiment denotes a process of drawing desired machining content on the surface of a workpiece W formed of metal, plastic, or another material by irradiating the pulsed laser L onto the surface of the workpiece W and using the thermal energy of the pulsed laser L to produce various physical effects such as transformation, melting, and removal of the surface layer of the workpiece W.

The ceramic marking process denotes a process of drawing desired machining content on the surface of a workpiece W formed of ceramic material by placing a metal foil Mf on the surface of the ceramic workpiece W and irradiating the pulsed laser L onto the metal foil Mf and surface of the workpiece W so that the thermal energy of the pulsed laser L melts the constituent materials of the metal foil Mf. This ceramic marking process will be described later in greater detail while referring to the drawings.

(Overall Structure of the Laser Machining Device 1)

Next, the overall structure of the laser machining device 1 constituting the laser machining system 100 will be described in detail while referring to the accompanying drawings. As shown in FIG. 1, the laser machining device 1 according to the present embodiment is configured of a main device unit 2, a laser controller 5, and a power unit 6.

The main device unit 2 performs a marking process by irradiating a pulsed laser L on a workpiece W while scanning the pulsed laser L two-dimensionally to draw desired content on the surface of the workpiece W. The laser controller 5 is configured of a computer. The laser controller 5 is connected to the data generating device 7 so as to be capable of bi-directional communications with the same, and is electrically connected to the main device unit 2 and power unit 6. The data generating device 7 is configured of a personal computer or the like and is used for generating machining data and the like. The laser controller 5 drives the main device unit 2 and power unit 6 according to machining data, control parameters, various command information, and the like received from the data generating device 7.

Note that the main device unit 2 is depicted schematically in FIG. 1 since the purpose of the drawings is to show the overall structures of the laser machining system 100 and the laser machining device 1. The structure of the main device unit 2 will be described later in greater detail.

(Overall Structure of the Main Device Unit 2)

Figure 2:
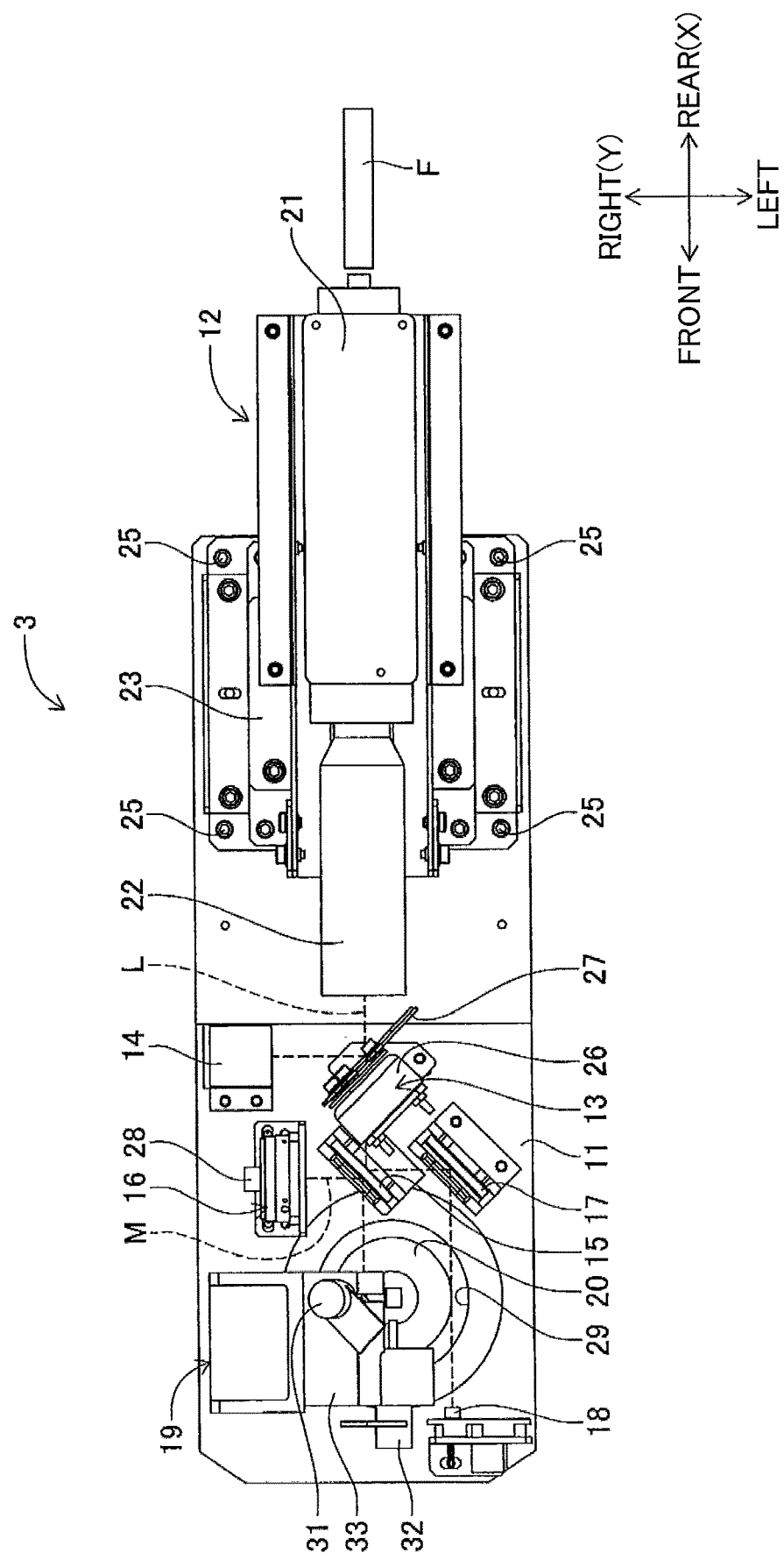
FIG. 2 is a plan view showing a structure of a laser head unit in a laser machining device according to the embodiment.

Next, the overall structure of the main device unit 2 will be described with reference to FIGS. 1 and 2. In the following description of the main device unit 2, the leftward, rightward, upward, and downward directions in FIG. 1 respectively correspond to frontward, rearward, upward, and downward directions relative to the main device unit 2. Hence, the direction in which a laser oscillator 21 (described later) emits the pulsed laser L corresponds to the forward direction; a direction perpendicular to a main base 11 (described later) and the path of the pulsed laser L corresponds to the upward/downward directions; and a direction orthogonal to both the upward/downward directions and frontward/rearward directions of the main device unit 2 corresponds to the leftward/rightward directions of the main device unit 2.

The main device unit 2 is configured of a laser head unit 3 (see FIG. 2), and a machining chamber (not shown). The laser head unit 3 emits the pulsed laser L and a visible laser beam M from an fθ lens 20 (described later) along the same axis. The machining chamber has a general box shape. The laser head unit 3 is fixed to the top surface of the machining chamber.

Figure 3:
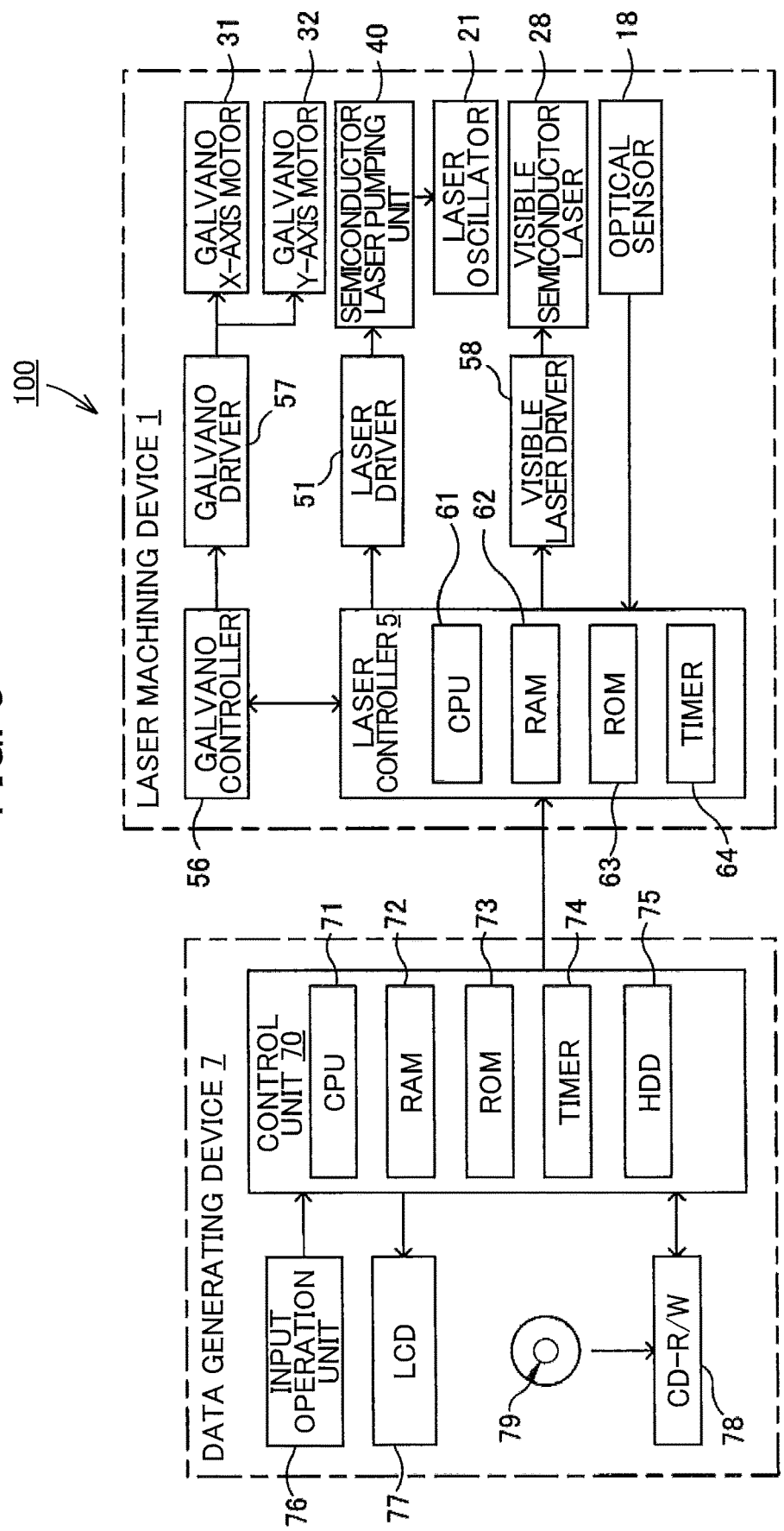
FIG. 3 is a block diagram showing a configuration of a control system in the laser machining system.

As shown in FIG. 3, the laser head unit 3 includes the main base 11, a laser oscillation unit 12 configured to emit a pulsed laser, a light shutter 13, a light damper 14, a half mirror 15, a guide optical section 16, a reflection mirror 17, an optical sensor 18, a galvano scanner 19, and the fθ lens 20. The laser head unit 3 is housed in a substantially cuboid-shaped housing (not shown).

The laser oscillation unit 12 includes the laser oscillator 21, a beam expander 22, and a mounting base 23. The laser oscillator 21 has a fiber connector, a condenser lens, a reflection mirror, a laser medium, a passive Q-switch, an output coupler, and a window, which are accommodated in a casing. The power unit 6 has a semiconductor laser pumping unit 40. The fiber connector is in optical communication with an optical fiber F. Pump light emitted from the semiconductor laser pumping unit 40 is incident upon the fiber connector via the optical fiber F.

The condenser lens concentrates the pump light incident from the fiber connector. The reflection mirror allows the pump light concentrated by the condenser lens to pass therethrough and simultaneously reflects a laser beam emitted from the laser medium at high efficiency. The laser medium is pumped by the pump light emitted from the semiconductor laser pumping unit 40 to oscillate the laser beam. For example, neodymium-doped gadolinium vanadate (Nd:GdVO4) crystal to which neodymium (Nd) is doped as a laser active ion, neodymium-doped yttrium vanadate (Nd:YVO4) crystal, and neodymium-doped yttrium aluminum garnet (Nd:YAG) crystal may be used as the laser medium.

The passive Q-switch is crystal having properties that a penetration rate becomes high when optical energy stored therein exceeds a certain value. Thus, the passive Q-switch functions as a Q-switch for oscillating the laser beam oscillated from the laser medium as a pulsed laser having a pulse shape. For example, chrome-doped YAG (Cr:YAG) crystal and Cr:MgSiO4 crystal may be used as the passive Q-switch.

The output coupler constitutes the reflection mirror and a laser resonator. The output coupler is, for example, a partial reflection mirror configured of a concave mirror having a surface coated with a dielectric layer film. The partial reflection mirror has a reflection rate from 80% to 95% in a wavelength of 1064 nm. The window is formed of synthetic silica or the like, and allows the laser beam emitted from the output coupler to pass therethrough outwardly. Thus, the laser oscillator 21 oscillates the pulsed laser through the passive Q-switch, and outputs the pulsed laser as the pulsed laser L for performing a marking process.

The beam expander 22 changes a beam diameter of the pulsed laser L, and is attached in coaxial relation to the axis of the laser oscillator 21. The laser oscillator 21 is mounted on the mounting base 23 so as to be capable of adjusting an optical axis of the pulsed laser L. The mounting base 23 is fixed by each mounting screw 25 at a position rearward from the center position in the frontward/rearward directions with respect to the upper surface of the main base 11.

The light shutter 13 includes a shutter motor 26 and a shutter 27. The shutter motor 26 is configured of a stepping motor or the like. The shutter 27 has a plate shape. The shutter 27 is attached to a motor shaft of the shutter motor 26, and coaxially rotates with the same. When the shutter 27 is rotated at a position where an optical path of the pulsed laser L emitted from the beam expander 22 is blocked, on one hand, the shutter 27 reflects the pulsed laser L toward the light damper 14 which is located on the right side of the light shutter 13. When the shutter 27 is rotated at a position out of the optical path of the pulsed laser L emitted from the beam expander 22, on the other hand, the pulsed laser L emitted from the beam expander 22 is incident upon the half mirror 15 which is located in front of the light shutter 13.

The light damper 14 absorbs the pulsed laser L reflected off the shutter 27. Heat generation of the light damper 14 is transferred to the main base 11 and thus the light damper 14 is cooled. The half mirror 15 is disposed so that the surface of the half mirror 15 is arranged to form an angle of 45 degrees obliquely to the frontward left direction with respect to the optical path of the pulsed laser L. The half mirror 15 allows substantially all the pulsed laser L incident into the rear side of the half mirror 15 to pass therethrough. A part of the pulsed laser L incident into the rear side of the half mirror 15 is reflected at 45 degrees so as to be directed toward the reflection mirror 17. The reflection mirror 17 is disposed at a left-side position relative to the central portion on the rear surface of the half mirror 15 upon which the pulsed laser L is incident.

The guide optical section 16 includes a visible semiconductor laser 28 and a lens array (not shown). The visible semiconductor laser 28 irradiates the visible laser beam M, such as a red laser beam, and the lens array collimates the visible laser beam M emitted from the visible semiconductor laser 28 into a parallel beam. The visible laser beam M has a wave length different from that of the pulsed laser L irradiated from the laser oscillator 21. The guide optical section 16 is disposed at a right-side position relative to the central portion of the front surface of the half mirror 15 from which the pulsed laser L is emitted. As a result, the visible laser beam M is incident upon the central portion of the reflection surface of the half mirror 15, from which the pulsed laser L is emitted, at an incident angle of 45 degrees with respect to the reflection surface of the half mirror 15 which is the front surface of the half mirror 15. Then, the visible laser beam M is reflected upon the reflection surface of the half mirror 15 at a reflection angle of 45 degrees and advances along the optical path of the pulsed laser L. That is, the visible semiconductor laser 38 irradiates the visible laser beam M along the optical path of the pulsed laser L.

The reflection mirror 17 is disposed to form an angle of 45 degrees obliquely to the frontward left direction with respect to the frontward/rearward directions parallel to the optical path of the pulsed laser L. A part of the pulsed laser L reflected upon the rear surface of the half mirror 15 is incident upon the central portion of the reflection surface of the reflection mirror 17 at an incident angle of 45 degrees. The reflection mirror 17 directs the pulsed laser L incident upon the reflecting surface of the reflection mirror 17 in the frontward direction at a reflection angle of 45 degrees.

The optical sensor 18 is configured of a photodiode capable of detecting emission intensity of the pulsed laser L and the like. As shown in FIG. 2, the optical sensor 18 is disposed at a front-side position of the reflection mirror 17 so as to receive the pulsed laser L emitted from the central portion of the reflection mirror 17 upon which the pulsed laser L is reflected. With such a positional relationship between the reflection mirror 17 and optical sensor 18, the emission intensity of the pulsed laser L can be detected. In this manner, the emission intensity of the pulsed laser L emitted from the laser oscillator 21 can be detected with the optical sensor 18.

The galvano scanner 19 is mounted above a through-hole 29 formed in the front end portion of the main base 11. The galvano scanner 19 directs the pulsed laser L emitted from the laser oscillation unit 12 and the visible laser beam M reflected off the half mirror 15 downward through the through-hole 29 and performs two-dimensional scan. The galvano scanner 19 is configured of a galvano X-axis motor 31 having a galvano X-axis mirror, a galvano Y-axis motor 32 having a galvano Y-axis mirror, and a main unit 33. The galvano X-axis motor 31 and galvano Y-axis motor 32 are mounted and retained in the main unit 33 by being fitted into respective mounting holes from the outside thereof, so that the motor shafts of the galvano X-axis motor 31 and galvano Y-axis motor 32 are orthogonal to each other.

The galvano X-axis mirror is mounted on a distal end of the motor shaft in the galvano X-axis motor 31 as a scanning mirror. The galvano X-axis mirror is used for scanning the pulsed laser L and visible laser beam M in an X-direction within the machining region on the surface of the workpiece W. The galvano Y-axis mirror is mounted on a distal end of the motor shaft in the galvano Y-axis motor 32 as a scanning mirror. The galvano Y-axis mirror is used for scanning the pulsed laser L and visible laser beam M reflected off the galvano X-axis mirror in a Y-direction within the machining region on the surface of the workpiece W.

Hence, the inside surfaces of the scanning mirrors mounted on the distal ends of the motor shafts in the corresponding galvano X-axis motor 31 and galvano Y-axis motor 32 oppose each other in the galvano scanner 19. By controlling the rotations of the galvano X-axis motor 31 and galvano Y-axis motor 32 in order to rotate of the respective galvano X-axis mirror and galvano Y-axis mirror, the scanning mirrors scan the pulsed laser L and visible laser beam M downward two-dimensionally. These two-dimensional scanning directions include the frontward/rearward directions (X-direction) and the leftward/rightward directions (Y-direction) within the machining region on the surface of the workpiece W.

The fθ lens 20 focuses the pulsed laser L and visible laser beam M scanned two-dimensionally by the galvano scanner 19 along the same optical axis toward the surface of the workpiece (for example, the workpiece W or the foil Mf placed on the surface of the workpiece W) disposed below the fθ lens 20. Hence, by controlling the rotations of the galvano X-axis motor 31 and galvano Y-axis motor 32, the fθ lens 20 can scan the pulsed laser L and visible laser beam M two-dimensionally in the frontward/rearward directions (X-direction) and the leftward/rightward directions (Y-direction) according to a desired machining pattern over the surface of the workpiece W or the surface of the foil Mf placed on the surface of the workpiece W.

(Overall Structure of the Power Unit 6)

Next, the overall structure of the power unit 6 in the laser machining device 1 will be described with reference to FIG. 1. As shown in FIG. 1, the power unit 6 includes the semiconductor laser pumping unit 40, a laser driver 51, a power supply part 52, and a cooling unit 53, which are provided in a casing 55. The power supply part 52 supplies a drive current for driving the semiconductor laser pumping unit 40 to the semiconductor laser pumping unit 40 through the laser driver 51. The laser driver 51 turns on and off the semiconductor laser pumping unit 40 with direct current according to laser driving data inputted from the laser controller 5.

The semiconductor laser pumping unit 40 is optically connected to the laser oscillator 21 through the optical fiber F. When a pulse-shaped drive current is inputted from the laser driver 51, the semiconductor laser pumping unit 40 injects, into the optical fiber F, the pump light as a laser beam having a wavelength corresponding to the output proportional to a current value exceeding a current threshold at which a laser beam is generated. Thus, the pump light from the semiconductor laser pumping unit 40 is injected into the laser oscillator 21 via the optical fiber F. For example, a laser bar using the GaAs may be used as the semiconductor laser pumping unit 40.

The cooling unit 53 is provided for keeping the temperature of the power supply part 52 and semiconductor laser pumping unit 40 within a prescribed range. The cooling unit 53 controls the temperature of the semiconductor laser pumping unit 40 by, for example, an electron cooling system to finely adjust an oscillation wavelength of the semiconductor laser pumping unit 40. Moreover, a cooling unit using a water-cooled system or an air-cooled system may be used as the cooling unit 53.

(Control System of the Laser Machining Device 1)

Next, the configuration of the control system of the laser machining device 1 constituting the laser machining system 100 will be described with reference to the drawings. As shown in FIG. 3, the laser machining device 1 includes the laser controller 5 for governing overall operations of the laser machining device 1, the laser driver 51, a galvano controller 56, a galvano driver 57, a visible laser driver 58, and the like. The laser controller 5 is in electrical communication with the laser driver 51, the galvano controller 56, the optical sensor 18, the visible laser driver 58, and the like.

The laser controller 5 includes a central processing unit (CPU) 61, a random access memory (RAM) 62, a read-only memory (ROM) 63, a timer 64, and the like. The CPU 61 is provided as an arithmetic device and a control device for governing overall operations of the laser machining device 1. The timer 64 is provided for measuring time. The CPU 61, RAM 62, ROM 63, and timer 64 are interconnected via a bus line (not shown), and are in data communication with one another.

The RAM 62 temporarily stores various results of arithmetic operations performed by the CPU 61, X- and Y-coordinate data of a scanning pattern for machining, and the like. The ROM 63 stores various kinds of programs including a program for performing arithmetic operations to obtain X- and Y-coordinate data of a scanning pattern for machining according to machining data transmitted from the data generating device 7 to store the X- and Y-coordinate data in the RAM 62.

The CPU 61 executes various arithmetic and control processes according to the control programs stored in the ROM 63. For example, the CPU 61 receives machining data from the data generating device 7 and computes X- and Y-coordinate data for respective machining points, galvano scanning speed data, and the like. Then, the CPU 61 outputs the resultant data to the galvano controller 56. Further, the CPU 61 outputs laser driving data for the semiconductor laser pumping unit 40 to the laser driver 51. The laser driving data relates to output light intensity of pump light from the semiconductor laser pumping unit 40, a time duration of outputting the pump light, and the like set according to the machining data inputted from the data generating device 7. Also, the CPU 61 outputs the X- and Y-coordinate data of the scanning pattern for machining, a control signal for instructing ON/OFF of the galvano scanner 19 and the like to the galvano controller 56.

The laser driver 51 drives and controls the semiconductor laser pumping unit 40 according to the laser driving data related to the output light intensity of the pump light of the semiconductor laser pumping unit 40, the time duration of outputting the pump light, and the like inputted from the laser controller 5. Specifically, the laser driver 51 generates a pulse-shaped drive current having a current value proportional to the output light intensity of the pump light indicated by the laser driving data inputted from the laser controller 5, and outputs the pulse-shaped drive current to the semiconductor laser pumping unit 40 for an output time duration in accordance with the time duration of outputting the pump light indicated by the laser driving data. Thus, the semiconductor laser pumping unit 40 emits the pump light having intensity corresponding to the output light intensity of the pump light into the optical fiber F for the output time duration.

The galvano controller 56 computes driving angles and rotational speeds of both the galvano X-axis motor 31 and galvano Y-axis motor 32 according to the X- and Y-coordinate data, the galvano scanning speed data, and the like of the scanning pattern for machining inputted from the laser controller 5. The galvano controller 50 outputs motor drive data representing the computed driving angle and rotational speed to the galvano driver 57.

The galvano driver 57 drives and controls the galvano X-axis motor 31 and galvano Y-axis motor 32 according to the motor drive data representing the driving angle and rotational speed and inputted from the galvano controller 56, thereby performing two-dimensional scan of the pulsed laser L and visible laser beam M.

The visible laser driver 58 controls the guide optical section 16 including the visible semiconductor laser 28 according to a control signal outputted from the laser controller 5. The visible laser driver 58 controls, for example, the timing of emission and the light amount of the visible laser beam M from the visible semiconductor laser 28 according to the control signal.

As shown in FIGS. 1 and 3, the laser controller 5 is connected to the data generating device 7 so as to be capable of bi-directional communications with the same. The laser controller 5 is configured to be able to receive machining data indicating machining content, control parameters of the main device unit 2, various user instructions, and the like from the date generating device 7.

(Control System of the Data Generating Device 7)

Next, the configuration of the control system of the data generating device 7 will be described with reference to the drawings. As illustrated in FIG. 3, the data generating device 7 is configured of a control unit 70 for governing overall operations of the data generating device 7, an input operation unit 76, a liquid crystal display (LCD) 77, a CD-R/W 78, and the like. The input operation unit 70 includes a mouse, a keyboard, and the like. The CD-R/W 78 is provided for reading from and writing into CD-ROMs 79 various types of data, programs, and the like.

The control unit 70 includes a CPU 71, a RAM 72, a ROM 73, a timer 74, a hard disk drive (HDD) 75, and the like. The CPU 71 is provided as an arithmetic device and a control device for governing overall operations of the data generating device 7. The timer 74 is provided for measuring time. The CPU 71, RAM 72, ROM 72, and timer 74 are interconnected via a bus line (not shown), and are in data communication with one another. The CPU 71 and HDD 75 are interconnected via an input-output interface (not shown), and are in data communication with each other.

The RAM 72 temporarily stores various results of arithmetic operation performed by the CPU 71 and the like. The ROM 73 stores various kinds of control programs and data tables.

The HDD 75 is a storage that stores programs for various kinds of application software, and various kinds of data files. In the present embodiment, the HDD 75 stores control programs such as a program for generating machining data (hereinafter called "machining data generating program") for performing a marking process (see FIG. 5), sets of control data such as a database of recommended machining conditions (hereinafter called "recommended conditions database", see FIG. 7, described later), and the like.

The CD-R/W 78 reads an application program and various data tables or other datasets from the CD-ROM 79, or writes such data into the CD-ROM 79. For example, the data generating device 7 reads the machining data generating program (see FIG. 5) and the recommended conditions database (see FIG. 7) from the CD-ROM 79 via the CD-R/W 78 and stores the machining data generating program, the recommended conditions database and other datasets on the HDD 75, thereby forming a database in the HDD 75.

Note that the machining data generating program (see FIG. 5) and the recommended conditions database (see FIG. 7) may instead be stored in the ROM 73 or may be read from a storage medium, such as the CD-ROM 79. Alternatively, the program and database may be downloaded over a network, such as the Internet (not shown).

The input operation unit 76, which is configured of a mouse, a keyboard, and the like; the LCD 77; and the like are electrically connected to the data generating device 7 via an input/output interface (not shown). Hence, the input operation unit 76 and LCD 77 of the data generating device 7 are used for generating machining data and specifying various settings each needed for performing a marking process.

(Steps in the Ceramic Marking Process)

Next, a process for marking ceramic material (referred to also as "ceramic marking process") with the laser machining system 100 according to the present embodiment will be described with reference to FIGS. 4A and 4B. The process is performed according to machining data generated by the data generating device 7 in a ceramic marking mode (described later).

As described above, the ceramic marking process performed on the laser machining system 100 according to the present embodiment includes a foil placing step, a marking step, and a foil removing step. FIG. 4A illustrates the marking step performed after completion of the foil placing step, and FIG. 4B illustrates the foil removing step performed after completion of the marking step. First, the metal foil Mf is placed on the surface of a workpiece W formed of a ceramic material (foil placing step), after which the foil Mf and the surface of the workpiece W are irradiated with a pulsed laser L in order to draw desired machining content on the surface of the workpiece W (marking step).

In the foil placing step, the foil Mf configured of a metal material is placed on the surface of the ceramic workpiece W within a fixed region relative to the surface of the workpiece W. At this time, the foil Mf placed on the surface of the workpiece W encompasses the area to be marked. In the present embodiment, the user performs the foil placing step by hand and subsequently places the workpiece W on which the foil Mf is placed at a desired position in the machining chamber of the laser machining device 1.

In the subsequent marking step, the laser machining device 1 irradiates the pulsed laser L onto the foil Mf and the workpiece W disposed inside the machining chamber of the laser machining device 1 and scans the pulsed laser L two-dimensionally to draw the desired machining content on the surface of the workpiece W. In the marking step of the ceramic marking process, the irradiated pulsed laser L melts the metal constituting the foil Mf so that the molten metal combines with the surface of the ceramic workpiece W, thereby directly drawing the machining content on the surface of the workpiece W.

In the present embodiment, the laser machining device 1 outputs and scans the pulsed laser L by controlling the laser oscillation unit 12, galvano scanner 19, and the like on the basis of machining data generated according to the machining data generating program described later (see FIG. 5).

In the present embodiment, the machining data generated in the ceramic marking mode includes various marking conditions related to the pulsed laser L to be irradiated onto the foil Mf and the workpiece W (the output intensity, scanning speed, and the like of the pulsed laser L), and machining content configured of a plurality of machining points. The various marking conditions for the pulsed laser L are set according to the composition of the foil Mf (for example, the constituent materials, thickness, and the like). Here, suitable conditions must be set in order to draw machining content reliably in the ceramic marking process because the level of energy required for melting metal constituting the foil Mf and for combining this molten metal with the surface of the ceramic workpiece W differs according to the composition of the foil Mf (the constituent materials, thickness, and the like). The various marking conditions included in the machining data are examples of a marking condition of the present disclosure.

After the marking step has been completed according to the machining data generated in the ceramic marking mode, the user removes the foil Mf and the workpiece W from the machining chamber of the laser machining device 1. At this time, the foil Mf has combined with the surface of the workpiece W in areas irradiated by the pulsed laser L, but can be removed from the surface of the workpiece W in other areas.

In the foil removing step, non-irradiated portions of the foil Mf are removed from the workpiece W that was subjected to the marking step. By executing the foil removing step, the foil Mf is removed from the surface of the workpiece W in all areas except areas in which the foil Mf was combined with the surface of the workpiece W by the pulsed laser L (i.e., areas corresponding to the machining content in the machining data). In this way, the laser machining device 1 can perform marking on ceramic materials, since portions of metal that were bonded to the ceramic by the irradiated pulsed laser L remain on the surface of the ceramic workpiece W in accordance with the machining content in the machining data. Note that the user performs the foil removing step by hand.

When markings are formed on the surface of a ceramic workpiece W according to the ceramic marking process described above, the state of the markings can be maintained so that they indicate the machining content included in the machining data, even if the workpiece W were to be subjected to heat treatment at high temperatures, provided that the temperature of the heat treatment is less than the melting point of the metal material constituting the foil Mf used in the ceramic marking process.

(Processing Content of Machining Data Generating Program)

Next, processing content of the machining data generating program executed on the data generating device 7 will be described in detail with reference to FIGS. 5 through 7. The program that implements steps in a process for generating machining data is an application program that generates machining data for marking a surface of a workpiece W by irradiating a pulsed laser L thereon, and is particularly designed for generating machining data used for marking ceramic materials. The CPU 71 of the data generating device 7 reads the machining data generating program from the HDD 75 and executes the program.

Figure 5:
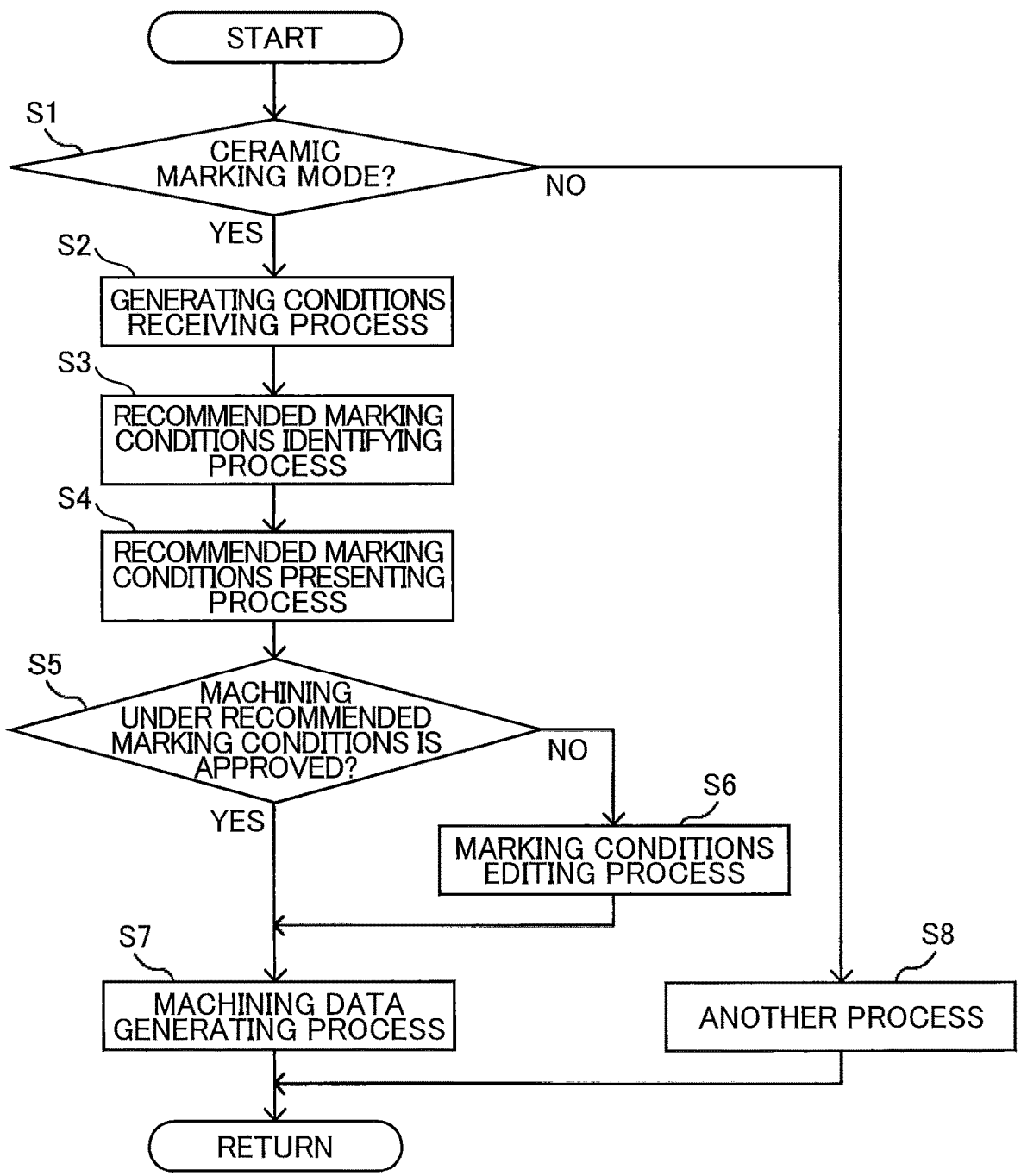
FIG. 5 is a flowchart illustrating steps in a process performed by executing a machining data generating program on a data generating device according to the embodiment.

When launching the machining data generating program, in S1 of FIG. 5 the CPU 71 first determines according to an operating signal received from the input operation unit 76 whether a generating mode has been set to the ceramic marking mode for marking ceramic materials. In the present embodiment, as described later, the data generating device 7 can execute the machining data generating program in a selected one of a plurality of generating modes including the ceramic marking mode. The CPU 71 advances to S2 when the generating mode is set to the ceramic marking mode (S1: YES) and advances to S8 when the generating mode is not set to the ceramic marking mode (S1: NO).

More specifically, when the CPU 71 of the data generating device 7 begins executing the machining data generating program in the present embodiment, the CPU 71 also displays a selection screen on the LCD 77 that allows the user to select one of a plurality of generating modes. The generating modes include the ceramic marking mode for marking ceramic materials and a normal marking mode for marking normal materials excluding ceramic materials. When the user selects one of the generating modes using the input operation unit 76, the CPU 71 receives the selection operation and implements the generating mode indicated by the user.

In S2 the CPU 71 executes a process for receiving data generating conditions (referred to also as "generating conditions receiving process"). In the generating conditions receiving process, the CPU 71 displays a marking parameters window 80 on the LCD 77. The marking parameters window 80 enables the CPU 71 to receive input from the user for various generating conditions (for example, constituent materials of the foil Mf and the like). The user performs operations to make selections using the input operation unit 76, and the CPU 71 receives the inputted generating conditions. The generating conditions received by the CPU 71 in S2 are examples of input information of the present disclosure.

(Configuration of the Marking Parameters Window 80)

Here, the marking parameters window 80 displayed on the LCD 77 will be described in detail with reference to the drawings. As shown in FIG. 6, the marking parameters window 80 has a generating conditions setting section 81 for setting generating conditions that include the composition of the foil Mf (for example, the material, thickness, and the like of the foil Mf), and a marking conditions setting section 90 for presenting marking conditions for a ceramic marking process in an editable format.

As described above, the generating conditions setting section 81 is an information receiving portion in which the user sets information regarding the material and thickness of the foil Mf as the foil information in the present disclosure, and generating conditions that include such information as the levels of priority for the machining quality and the duration of the ceramic marking process. The generating conditions setting section 81 has a foil material setting element 82, a foil thickness setting element 83, a machining quality setting element 84, and a GENERATE PARAMETERS button 85.

The foil material setting element 82 is used for inputting/setting the material constituting the foil Mf as one aspect of the foil information. In the present embodiment, the user can select one of various metal materials in the foil material setting element 82, including material (A), material (B), and material (C), as the material of the foil Mf to be used in the ceramic marking process. Material (A) denotes a metal having low light absorptivity (0.1 or less, for example) at the wavelength of the pulsed laser L used for machining. Material (B) denotes a metal having moderate light absorptivity (greater than 0.1 but less than 0.3, for example) at the wavelength of the pulsed laser L. Material (C) denotes a metal having high light absorptivity (0.3 or greater, for example) at the wavelength of the pulsed laser L. Using the input operation unit 76 of the data generating device 7, the user can operate the foil material setting element 82 of the marking parameters window 80 to specify the material of the foil Mf that will be used in the ceramic marking process. This material is one aspect of the foil information constituting the generating conditions. The foil information received through the foil material setting element 82 can be used to identify the most suitable marking conditions for the ceramic marking process since the level of energy of a pulsed laser L required to melt the foil Mf differs according to the light absorptivity of the material constituting the foil Mf.

Note that materials (A), (B), and (C) are merely examples of types of materials for the foil Mf. Other examples of metal materials that may be used in the ceramic marking process include copper, nickel, nichrome, cupronickel, iron, aluminum, chromium, and titanium. Further, the light absorptivity of the foil Mf is essentially determined depending on the material of the foil Mf. Hence, in the present embodiment, receiving foil information specifying the material of the foil Mf inputted through the foil material setting element 82 is equivalent to receiving information related to the light absorptivity of the foil Mf.

The foil thickness setting element 83 is configured of a slider that is used to input/set the thickness of the foil Mf to be used in the ceramic marking process. The thickness of the foil Mf is another aspect of the foil information. Through operations of the input operation unit 76, the user can set the foil thickness setting element 83 to any numerical value within a range of values between a minimum value and a maximum value. In the present embodiment, the thickness of the foil Mf is classified as "thin" when no greater than 5 μm, "medium" when greater than 5 μm but no greater than 15 μm, and "thick" when greater than 15 μm. Hence, the user adjusts the foil thickness setting element 83 in the marking parameters window 80 using the input operation unit 76 of the data generating device 7 to specify the thickness of the foil Mf to be used in the ceramic marking process as part of the foil information constituting the generating conditions. By receiving the foil information through the foil thickness setting element 83, the CPU 71 can identify more suitable marking conditions for the ceramic marking process since a greater level of energy is necessary for melting the metal of the foil Mf and combining the metal with the surface of the ceramic workpiece W when the foil Mf is thicker.

The machining quality setting element 84 is also configured of a slider that is used to input/set the levels of priority for each of the machining quality of the ceramic marking process and the duration of the marking step in this process as generating conditions. In the ceramic marking process according to the present embodiment, increasing machining quality to produce finer markings tends to increase the time required for machining, while reducing the machining duration to speed up the machining process tends to lead to a drop in machining quality. Hence, the user can adjust the machining quality setting element 84 of the marking parameters window 80 using the input operation unit 76 of the data generating device 7 to set the priorities of machining quality and duration for the ceramic marking process as part of the generating conditions.

When the GENERATE PARAMETERS button 85 is selected, the CPU 71 identifies and extracts various marking conditions recommended for the various generating conditions including the composition of the foil Mf (the materials and thickness) to be used in the ceramic marking process according to the information of the generating conditions received through the foil material setting element 82, foil thickness setting element 83, and machining quality setting element 84 and a recommended conditions database (see FIG. 7) The various marking conditions identified by the CPU 71 may include output intensity, scanning speed, a scanning number of times, a frequency, and a pulse width of the pulsed laser L, for example. Hence, when the GENERATE PARAMETERS button 85 is operated in the present embodiment, the CPU 71 receives the content inputted/set into the foil material setting element 82, foil thickness setting element 83, and machining quality setting element 84 and stores this content in the RAM 72 as the generating conditions.

Figure 6:
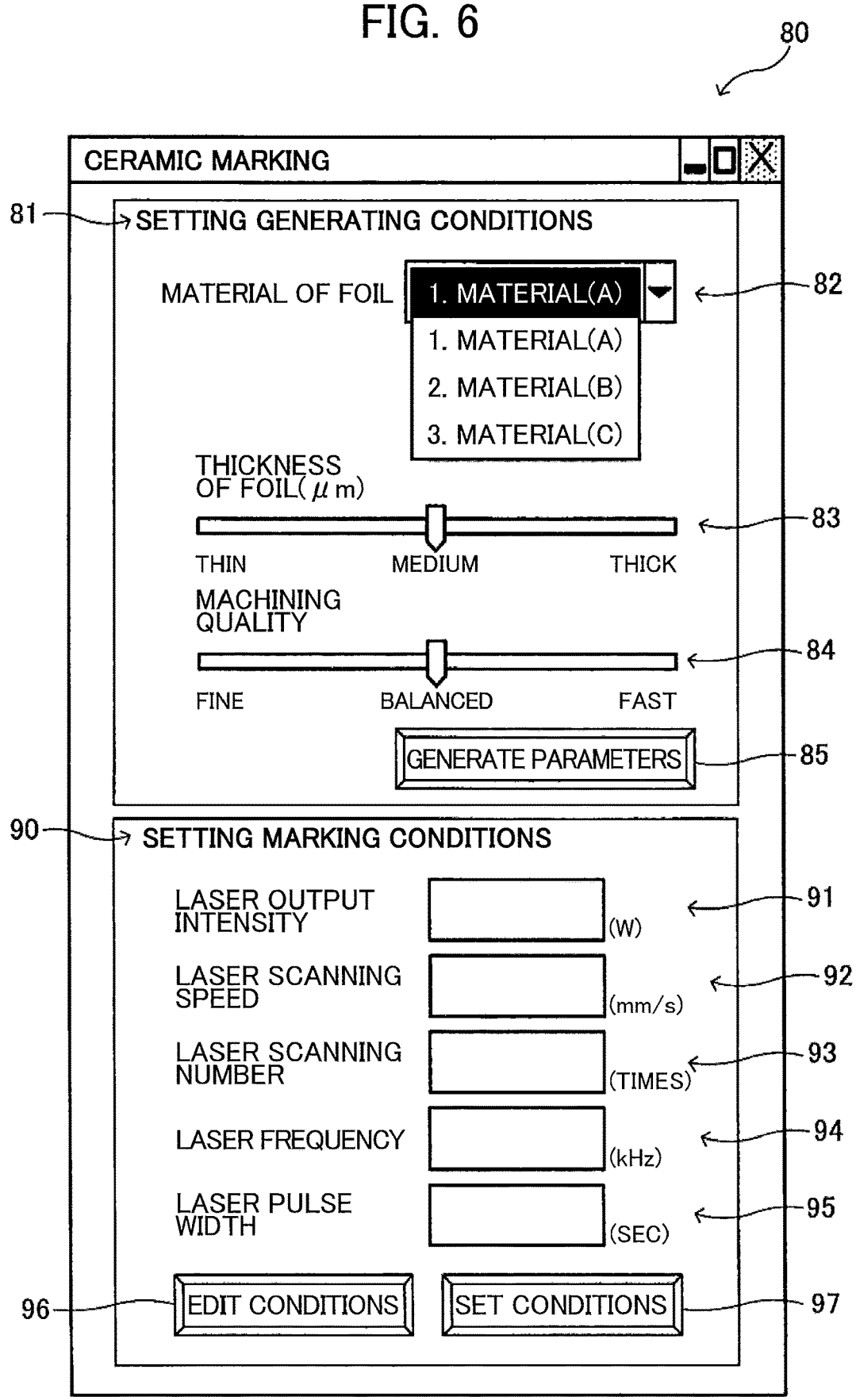
FIG. 6 is an explanatory diagram showing an example of a marking parameters window displayed on a LCD of the data generating device according to the embodiment.

As shown in FIG. 6, the marking conditions setting section 90 includes an output intensity setting element 91, a scanning speed setting element 92, a scanning number setting element 93, a frequency setting element 94, a pulse width setting element 95, an EDIT CONDITIONS button 96, and a SET CONDITIONS button 97. The marking conditions setting section 90 is used for presenting each of the recommended marking conditions identified according to the generating conditions received in the generating conditions setting section 81 and for editing each of these marking conditions.

The output intensity setting element 91 is used for setting the output intensity of the pulsed laser L irradiated onto the foil Mf and the surface of the workpiece W. The output intensity is one marking condition for the marking step of the ceramic marking process. The output intensity setting element 91 includes a text box. In a recommended marking conditions presenting process described later (S4), the CPU 71 displays in the text box of the output intensity setting element 91 the value for the output intensity of the pulsed laser L identified according to the generating conditions received in the generating conditions setting section 81. Further, in a marking conditions editing process described later (S6), the CPU 71 can edit the value for the output intensity of the pulsed laser L upon receiving input in the text box of the output intensity setting element 91.

The scanning speed setting element 92 is used for setting the scanning speed of the pulsed laser L when drawing the machining content included in the machining data. The scanning speed is another marking condition for the marking step. The scanning speed setting element 92 also has a text box. In the recommended marking conditions presenting process described later (S4), the CPU 71 displays in the text box of the scanning speed setting element 92 the value for the scanning speed of the pulsed laser L identified according to the generating conditions received in the generating conditions setting section 81. Further, in the marking conditions editing process described later (S6), the CPU 71 can edit the value of the scanning speed for the pulsed laser L upon receiving input in the text box of the scanning speed setting element 92.

The scanning number setting element 93 is used for setting the scanning number of times performed with the pulsed laser L for drawing the machining content in the machining data. More specifically, the scanning number of times denotes the scanning number of times one scanning line is scanned with the pulsed laser L in one marking process. The scanning number of times is another marking condition for the marking step. The scanning number setting element 93 also includes a text box. In the recommended marking conditions presenting process described later (S4), the CPU 71 displays in the text box of the scanning number setting element 93 a value for the scanning number of times for the pulsed laser L identified according to the generating conditions received in the generating conditions setting section 81. Further, in the marking conditions editing process (S6), the CPU 71 can edit the value of the scanning number of times for the pulsed laser L upon receiving input in the text box of the scanning number setting element 93.

The frequency setting element 94 is used for setting the frequency of the pulsed laser L for drawing the machining content included in the machining data. The frequency of the pulsed laser L is another marking condition for the marking step. Further, the frequency setting element 94 also includes a text box. In the recommended marking conditions presenting process described later (S4), the CPU 71 displays in the text box of the frequency setting element 94 a value for the frequency of the pulsed laser L identified according to the generating conditions received in the generating conditions setting section 81. Further, in the marking conditions editing process (S6), the CPU 71 can edit the value for the frequency of the pulsed laser L upon receiving input in the text box of the frequency setting element 94.

The pulse width setting element 95 is used for setting the pulse width of the pulsed laser L for drawing the machining content included in the machining data. The pulse width of the pulsed laser L is another marking condition for the marking step. The pulse width setting element 95 also has a text box. In the recommended marking conditions presenting process described later (S4), the CPU 71 displays in the text box of the pulse width setting element 95 the value for the pulse width of the layer identified according to the generating conditions received in the generating conditions setting section 81. Further, in the marking conditions editing process (S6), the CPU 71 can edit the value for the pulse width of the pulsed laser L upon receiving input in the text box of the pulse width setting element 95.

The user operates the EDIT CONDITIONS button 96 using the input operation unit 76 in order to edit any values of the recommended marking conditions identified according to the generating conditions received in the generating conditions setting section 81. When the values for all recommended marking conditions identified according to the generating conditions received in the generating conditions setting section 81 are acceptable, the user operates the SET CONDITIONS button 97 using the input operation unit 76 in order to generate machining data on the basis of the recommended marking conditions.

Therefore, in the generating conditions receiving process (S2), the CPU 71 receives input in the generating conditions setting section 81 of the marking parameters window 80. After the CPU 71 has received input in the foil material setting element 82, foil thickness setting element 83, and machining quality setting element 84 constituting the generating conditions setting section 81 and the GENERATE PARAMETERS button 85 has been operated, the CPU 71 stores each of the generating conditions inputted through the setting elements 82-84 in the RAM 72 and advances to S3.

In S3 the CPU 71 executes a process for identifying recommended marking conditions (referred to also as "recommended marking conditions identifying process). Here, the CPU 71 identifies recommended marking conditions that are suited to the composition of the foil Mf (the material and thickness) to be used in the ceramic marking process and the like according to the generating conditions (including the foil information) received through each of the foil material setting element 82, foil thickness setting element 83, and machining quality setting element 84 in the generating conditions setting section 81 and the recommended conditions database (see FIG. 7). After identifying the recommended marking conditions, the CPU 71 advances to S4.

(Recommended Conditions Database)

Here, the content of the recommended conditions database that the CPU 71 references in S3 for identifying recommended marking conditions will be described with reference to FIG. 7.

As shown in FIG. 7, the recommended conditions database associates a set of recommended marking conditions containing marking conditions recommended for sets of generating conditions (hereinafter called "generating condition sets"). The generating condition sets include foil information (information specifying the material of the foil Mf and information specifying the thickness of the foil Mf), and information related to the machining quality for the ceramic marking process. The recommended marking conditions associated with each generating condition set include information related to the output intensity of the pulsed laser L, information related to the scanning speed of the pulsed laser L, information related to the scanning number of times of the pulsed laser L, information related to the frequency of the pulsed laser L, and information related to the pulse width of the pulsed laser L.

In the recommended conditions database, the generating condition sets related to the material (A) of a foil Mf having a low light absorptivity (equal to or less than 0.1) at the wavelength of the pulsed laser L are associated with information indicating the output intensity, scanning speed, and scanning number of times of the pulsed laser L, each of which constitutes a recommended marking condition. In this example, the information on the output intensity specifies one of 5.0, 10.0, and 15.0 W. The information on the scanning speed specifies one of 10, 100, and 200 mm/sec. The information on the scanning number of times specifies one of 2, 4, and 5 times.

The generating condition sets for the material (B) of a foil Mf having a moderate light absorptivity (greater than 0.1 and less than 0.3) at the wavelength of the pulsed laser L are associated with information indicating the output intensity, scanning speed, and scanning number of times of the pulsed laser L, each of which constitutes a recommended marking condition. In this example, the information on the output intensity specifies one of 2.0, 3.5, and 5.0 W. The information on the scanning speed specifies one of 50, 250, and 500 mm/sec. The information on the scanning number of times specifies one of 1, 2, and 3 times.

The generating condition sets for the material (C) of a foil Mf having a high light absorptivity (equal to or greater than 0.3) at the wavelength of the pulsed laser L are associated with information indicating the output intensity, scanning speed, and scanning number of times of the pulsed laser L, each of which constitutes a recommended marking condition. In this example, the information on the output intensity specifies one of 0.5, 1.0, and 2.0 W. The information on the scanning speed specifies one of 200, 500, and 1,000 mm/sec. The information on the scanning number of times specifies one of 1, 2, and 3 times.

As described above, the material of the foil Mf and the light absorptivity of the foil Mf at the wavelength of the pulsed laser L must be considered because the metal constituting the foil Mf must melt during the ceramic marking process. In the recommended conditions database, the recommended marking conditions that include the output intensity, scanning speed, and scanning number of times of the pulsed laser L are associated with the light absorptivity of the foil Mf at the wavelength of the pulsed laser L and the material of the foil Mf. Accordingly, it is possible to identify suitable marking conditions. Note that, while not shown in FIG. 7, recommended content (values) for other marking conditions such as the pulse width of the pulsed laser L are also associated with the light absorptivity of the foil Mf at the wavelength of the pulsed laser L in the recommended conditions database.

Therefore, when executing the recommended marking conditions identifying process in S3, the CPU 71 references the generating conditions (including the foil information) received through the foil material setting element 82, foil thickness setting element 83, and machining quality setting element 84 of the generating conditions setting section 81 and the recommended conditions database (see FIG. 7) to identify recommended marking conditions suited to the composition (materials and thickness) of the foil Mf to be used in the ceramic marking process and the like.

As described above, the recommended conditions database associates recommended marking conditions belonging to prescribed numerical ranges with the material of the foil Mf (material (A), material (B), material (C), etc.) and the light absorptivity identified according to the foil material. Thus, in the recommended marking conditions identifying process of S3, the CPU 71 can identify the marking conditions corresponding to the information (foil information) received through the foil material setting element 82 (i.e., the material and light absorptivity of the foil Mf).

Further, the output intensity of the pulsed laser L, which is one of the recommended marking conditions, is set to a larger value in the recommended conditions database for larger values of the thickness of the foil Mf received through the foil thickness setting element 83, as shown in FIG. 7. Therefore, in the recommended marking conditions identifying process of S3, the CPU 71 can identify recommended marking conditions for the output intensity of the pulsed laser L that is larger within the numerical range identified according to the information (foil information) received through the foil material setting element 82 (i.e., the material and light absorptivity of the foil Mf) when the thickness of the foil Mf received through the foil thickness setting element 83 is larger.

Further, the recommended conditions database associates information specifying different values for the scanning speed of the pulsed laser L with information indicating the machining quality (fine, balanced, and fast in FIG. 7) received as one of the generating conditions, such that a smaller value for the scanning speed is associated with a higher value for machining quality (i.e., "fine"; see FIG. 7). Thus, in the recommended marking conditions identifying process in S3, the CPU 71 can identify a recommended marking condition for the scanning speed of the pulsed laser L according to the machining quality received through the machining quality setting element 84 to be the most suitable value within the numerical range identified according to the information received through the foil material setting element 82 (i.e., the material and light absorptivity of the foil Mf).

Returning to FIG. 5, the remainder of the processing content of the machining data generating program will be described from step S4. After completing the recommended marking conditions identifying process in S3, in S4 the CPU 71 executes a process for presenting the recommended marking conditions identified in S3 (referred to also as "recommended marking conditions presenting process"). Specifically, the CPU 71 displays each of the recommended marking conditions identified in S3 in the corresponding text boxes of the marking conditions setting section 90 constituting the bottom portion of the marking parameters window 80. That is, the CPU 71 reads each of the recommended marking conditions identified in S3 (for example, information related to the output intensity of the pulsed laser L) from the RAM 72 and displays the numerical values for the recommended marking conditions in the text boxes of the output intensity setting element 91, scanning speed setting element 92, scanning number setting element 93, frequency setting element 94, and pulse width setting element 95 constituting the marking conditions setting section 90. Subsequently, the CPU 71 advances to S5.

In S5 the CPU 71 determines according to operating signals from the input operation unit 76 whether the user has approved of machining under the recommended marking conditions. More specifically, the CPU 71 determines whether the user has selected the SET CONDITIONS button 97 in the marking parameters window 80 using the input operation unit 76. When the user approves of the recommended marking conditions for the machining process (S5: YES), the CPU 71 advances to S7. However, if the user operates the EDIT CONDITIONS button 96 in the marking conditions setting section 90 indicating that the recommended marking conditions are not acceptable (S5: NO), the CPU 71 advances to S6.

When advancing to S6, the CPU 71 executes a process for editing the marking conditions (referred to also as "marking conditions editing process"). In this process, the CPU 71 receives editing operations from the user for changing the values specifying one or more of the output intensity, scanning speed, scanning number of times, frequency, and pulse width of the pulsed laser L constituting the recommended marking conditions to desired values. Specifically, the CPU 71 receives input operations in the text boxes of the output intensity setting element 91, scanning speed setting element 92, scanning number setting element 93, frequency setting element 94, and pulse width setting element 95 according to operating signals from the input operation unit 76 and edits the marking conditions for the ceramic marking process according to these input operations. Subsequently, after an input operation on the SET CONDITIONS button 97 is performed in the marking conditions editing process of S6, the CPU 71 sets the content for each marking condition, stores this content in the RAM 72, and advances to S7.

In S7 the CPU 71 performs a process to generate the machining data (referred to also as "machining data generating process"). In this step, the CPU 71 generates machining data for the ceramic marking process. More specifically, the CPU 71 reads either the recommended marking conditions identified in the process of S3 or the marking conditions edited in the editing process of S6 from the RAM 72 and generates machining data for the ceramic marking process by including machining content to be drawn on the surface of a workpiece W through the ceramic marking process together with the marking conditions. Subsequently, the CPU 71 ends the machining data generating process.

Note that after completion of the machining data generating process in S7, the CPU 71 may output the machining data generated in S7 to the laser controller 5 together with a machining execution command. In this case, upon receiving the machining execution command and machining data, the CPU 61 of the laser controller 5 controls the laser driver 51 and galvano driver 57 according to the machining data. In this way, the laser machining device 1 according to the present embodiment executes the marking step in the ceramic marking process by irradiating a pulsed laser L onto the foil Mf and workpiece W. Here, the CPU 71 may be configured to store the machining data generated in S7 in the HDD 75 or another storage device after completion of the machining data generating process in S7.

Further, when the CPU 71 determines in S1 that the ceramic marking mode is not set (S1: NO), in S8 the CPU 71 executes another process that excludes processes of steps S2-S7 for generating machining data for a ceramic marking process. In the other process of S8, the CPU 71 may execute a process to generate machining data and the like for a normal marking process, for example. After completing this other process in S8, the CPU 71 ends execution of the machining data generating program.

(Evaluating Recommended Marking Conditions Set Through Execution of the Machining Data Generating Program)

As described above, the data generating device 7 and the like in the present embodiment identify recommended marking conditions (S3) corresponding to the composition (materials and thickness) of the foil Mf on the basis of foil information received through the generating conditions setting section 81 of the marking parameters window 80 that includes the material of the foil Mf and the thickness of the foil Mf, and the recommended conditions database stored in the HDD 75. On the basis of these recommended marking conditions, the data generating device 7 can generate machining data for a ceramic marking process (S7).

FIGS. 8 through 11 show the results of various experiments performed to verify whether the marking conditions in the machining data generated according to the machining data generating program are marking conditions suited to the composition of the foil Mf. In the present embodiment, the marking conditions suited to the composition of the foil Mf denote marking conditions that produce satisfactory machining results in a ceramic marking process employing the foil Mf.

In the experiments described below, machining content was drawn on a surface of a workpiece W through a ceramic marking process employing a foil Mf. The machining content includes a mark formed by filling the inside of a square, and a character string "123" written left-to-right beneath the mark (see FIG. 8).

In these experiments, the material of the foil Mf and the marking conditions including the output intensity, scanning speed, scanning number of times, and the like of the pulsed laser L were suitably set, and the effect that each marking condition had on the ceramic marking process using a foil Mf with a prescribed composition was evaluated to identify a range of values for each marking condition that is recommended for good machining results in the ceramic marking process. In the experiments, emphasis was placed on the legibility of the machining results of the ceramic marking process. The machining results were evaluated visually and assigned one of three levels (specifically, ○, Δ, and X) according to prescribed criteria.

As shown in FIG. 8, the symbol ○ denotes a good visual evaluation of the machining results of the ceramic marking process. The criteria for the evaluation ○ is that both the mark and character string in the machining content are drawn on the surface of the workpiece W. On the basis of the results shown in FIG. 8, both the mark and character string are drawn successfully in three machining results, i.e., when the output intensity of the pulsed laser L is 12, 8, and 5 W. Accordingly, each of these three machining results is given the evaluation ○.

The symbol X denotes a poor visual evaluation of the machining results. The criteria for the evaluation X is that neither the mark nor the character string are drawn in their entirety on the surface of the workpiece W. On the basis of the machining results in FIG. 8, the machining process using output intensity of 2 W for the pulsed laser L resulted in neither the mark nor the character string being drawn. Accordingly, this machining result is assessed the evaluation X.

The symbol Δ denotes an intermediate evaluation in which the machining results are between the ○ and X evaluations. The criteria for the evaluation Δ is that either the mark or the character string in the machining content was not drawn satisfactorily. On the basis of the machining results in FIG. 8, the character string "123" was drawn successfully on the surface of the workpiece W when the output intensity of the pulsed laser L was set to 4 W, but the upper portion of the mark was not drawn successfully. Accordingly, this machining result is assessed the evaluation Δ. In addition, when the output intensity of the pulsed laser L was set to 3 W, a portion of the mark is missing in the machining results, and the character string "123" is missing completely. Thus, this machining results is also assessed the evaluation Δ.

Below is a description of the experiments performed to evaluate the effects of each marking condition on the machining results of ceramic marking processes employing foils Mf with a prescribed composition according to the above-mentioned criteria, and to identify a range of values for each marking condition recommended for good machining results.

(Effects of Marking Conditions when Using Foil Configured of Low Light-Absorbing Material)

First, the effects of each marking condition on machining results of a ceramic marking process using a foil Mf configured of low light-absorbing material will be verified while referring to FIGS. 9A through 9C. In the present embodiment, the low light-absorbing material denotes material having light absorptivity equal to or less than 0.1. Material (A) can be used as an example of such low light-absorbing material. In the experiments shown in FIGS. 9A through 9C, ceramic marking processes were performed using a foil Mf formed of material having light absorptivity equal to or less than 0.1 to verify the effects of the output intensity, scanning speed, and scanning number of times of the pulsed laser L on machining quality.

The experimental results shown in the lower part of FIG. 9A indicate visual evaluations of machining results produced in ceramic marking processes using a foil Mf formed of the prescribed material having light absorptivity equal to or less than 0.1 while varying the output intensity of the pulsed laser L. Note that while the output intensity of the pulsed laser L was varied in seven steps, the other experimental marking conditions were fixed at prescribed values, such as scanning speed of 50 mm/sec and a scanning number of times of 2 for the pulsed laser L.

As shown in the experimental results of FIG. 9A, a visual evaluation of ○ was determined for output intensity of 20, 12, 8, and 4.6 W, a visual evaluation of Δ was determined for output intensity of 4 and 3 W, and a visual evaluation of X was determined for an output intensity of 2 W. Thus, when a foil Mf formed of the prescribed material having light absorptivity equal to or less than 0.1 is used in the ceramic marking processes and the output intensity of the pulsed laser L is the marking condition being evaluated, the numerical range of the marking condition recommended for obtaining good machining results was identified to be 4.6-20 W on the basis of the experimental results in FIG. 9A.

In the recommended conditions database shown in FIG. 7, on the other hand, the information on the output intensity of the pulsed laser L associated with generating condition sets for material (A) includes the values 5.0, 10.0, and 15.0 W, which fall within the numerical range of 4.6-20 W. As described above, the material (A) of the foil Mf has low light absorptivity (equal to or less than 0.1) at the wavelength of the pulsed laser L. In other words, the information associated with the generating condition sets for material (A) in the recommended conditions database falls within the numerical range identified according to the experimental results in FIG. 9A. Accordingly, this information was found to be equivalent to the output intensity of the pulsed laser L recommended for obtaining good machining quality.

The experimental results shown in the lower part of FIG. 9B indicate visual evaluations of machining results produced in ceramic marking processes using a foil Mf formed of the prescribed material having light absorptivity equal to or less than 0.1 while varying the scanning speed of the pulsed laser L. Note that while the scanning speed of the pulsed laser L was varied in seven steps, the other experimental marking conditions were fixed at prescribed values, such as output intensity of 5 W and a scanning number of times of 2 for the pulsed laser L.

As shown in the experimental results of FIG. 9B, a visual evaluation of ○ was determined for scanning speed of 10, 20, 40, 80, 100, and 200 mm/sec, and a visual evaluation of X was determined for scanning speed of 400 mm/sec. Thus, when a foil Mf formed of the prescribed material having light absorptivity equal to or less than 0.1 is used in the ceramic marking processes and the scanning speed of the pulsed laser L is the marking condition being evaluated, the numerical range of the marking condition recommended for obtaining good machining results was identified to be 10-200 mm/sec on the basis of the experimental results in FIG. 9B.

In the recommended conditions database shown in FIG. 7, on the other hand, the information on the scanning speed of the pulsed laser L associated with generating condition sets for material (A) includes the values 10, 100, and 200 mm/sec, which fall within the numerical range of 10-200 mm/sec. As described above, the material (A) of the foil Mf has low light absorptivity (equal to or less than 0.1) at the wavelength of the pulsed laser L. In other words, the information associated with the generating condition sets for material (A) in the recommended conditions database falls within the numerical range identified according to the experimental results in FIG. 9B. Accordingly, this information was found to be equivalent to the scanning speed of the pulsed laser L recommended for obtaining good machining quality.

The experimental results shown in the lower part of FIG. 9C indicate visual evaluations of machining results produced in ceramic marking processes using a foil Mf formed of a prescribed material having light absorptivity equal to or less than 0.1 while varying the scanning number of times performed with the pulsed laser L. Note that while the scanning number of times of the pulsed laser L was varied in seven steps, the other experimental marking conditions were fixed at prescribed values, such as output intensity of 5 W and scanning speed of 50 mm/sec for the pulsed laser L.

As shown in the experimental results of FIG. 9C, a visual evaluation of ○ was determined for scanning numbers of times of 2, 3, 4, and 5, a visual evaluation of Δ was determined for scanning numbers of times of 1 and 6, and a visual evaluation of X was determined for a scanning number of times of 7. Thus, when a foil Mf formed of the prescribed material having light absorptivity equal to or less than 0.1 is used in the ceramic marking processes and the scanning number of times of the pulsed laser L is the marking condition being evaluated, the numerical range of the marking condition recommended for obtaining good machining results was identified to be 2-5 on the basis of the experimental results in FIG. 9C.

In the recommended conditions database shown in FIG. 7, on the other hand, the information on the scanning numbers of times of the pulsed laser L associated with generating condition sets for material (A) includes the values 2, 4, and 5, which fall within the numerical range of 2-5. As described above, the material (A) of the foil Mf has low light absorptivity (equal to or less than 0) at the wavelength of the pulsed laser L. In other words, the information associated with the generating condition sets for material (A) in the recommended conditions database falls within the numerical range identified according to the experimental results in FIG. 9C. Accordingly, this information was found to be equivalent to the scanning numbers of times of the pulsed laser L recommended for obtaining good machining quality.

(Effects of Marking Conditions when Using Foil Configured of Moderate Light-Absorbing Material)

Next, the effects of each marking condition on machining results of a ceramic marking process using a foil Mf configured of moderate light-absorbing material will be verified while referring to FIGS. 10A through 10C. In the present embodiment, the moderate light-absorbing material denotes material having light absorptivity greater than 0.1 and less than 0.3. Material (B) can be used as an example of such moderate light-absorbing material. In the experiments shown in FIGS. 10A through 10C, ceramic marking processes were performed using a foil Mf formed of material having light absorptivity greater than 0.1 and less than 0.3 to verify the effects of the output intensity, scanning speed, and scanning number of times of the pulsed laser L on machining quality.

The experimental results shown in the lower part of FIG. 10A indicate visual evaluations of machining results produced in ceramic marking processes using a foil Mf formed of the prescribed material having light absorptivity greater than 0.1 and less than 0.3 while varying the output intensity of the pulsed laser L. Note that while the output intensity of the pulsed laser L was varied in six steps, the other experimental marking conditions were fixed at prescribed values, such as scanning speed of 50 mm/sec and a scanning number of times of 2 for the pulsed laser L.

As shown in the experimental results of FIG. 10A, a visual evaluation of ○ was determined for output intensity of 5, 4, 3, and 2 W, a visual evaluation of Δ was determined for output intensity of 1 W, and a visual evaluation of X was determined for output intensity of 10 W. Thus, when a foil Mf formed of the prescribed material having light absorptivity greater than 0.1 and less than 0.3 is used in the ceramic marking processes and the output intensity of the pulsed laser L is the marking condition being evaluated, the numerical range of the marking condition recommended for obtaining good machining results was identified to be 2-5 W on the basis of the experimental results in FIG. 10A.

In the recommended conditions database shown in FIG. 7, on the other hand, the information on the output intensity of the pulsed laser L associated with generating condition sets for material (B) includes the values 2.0, 3.5, and 5.0 W, which fall within the numerical range of 2-5 W. As described above, the material (B) of the foil Mf has moderate light absorptivity (greater than 0.1 and less than 0.3) at the wavelength of the pulsed laser L. In other words, the information associated with the generating condition sets for material (B) in the recommended conditions database falls within the numerical range identified according to the experimental results in FIG. 10A. Accordingly, this information was found to be equivalent to the output intensity of the pulsed laser L recommended for obtaining good machining quality.

The experimental results shown in the lower part of FIG. 10B indicate visual evaluations of machining results produced in ceramic marking processes using a foil Mf formed of the prescribed material having light absorptivity greater than 0.1 and less than 0.3 while varying the scanning speed of the pulsed laser L. Note that while the scanning speed of the pulsed laser L was varied in seven steps, the other experimental marking conditions were fixed at prescribed values, such as output intensity of 4 W and a scanning number of times of 2 for the pulsed laser L.

As shown in the experimental results of FIG. 10B, a visual evaluation of ○ was determined for scanning speed of 50, 100, 200, 300, and 500 mm/sec, a visual evaluation of Δ was determined for scanning speed of 20 mm/sec, and a visual evaluation of X was determined for scanning speed of 700 mm/sec. Thus, when a foil Mf formed of the prescribed material having light absorptivity greater than 0.1 and less than 0.3 is used in the ceramic marking processes and the scanning speed of the pulsed laser L is the marking condition being evaluated, the numerical range of the marking condition recommended for obtaining good machining results was identified to be 50-500 mm/sec on the basis of the experimental results in FIG. 10B.

In the recommended conditions database shown in FIG. 7, on the other hand, the information on the scanning speed of the pulsed laser L associated with generating condition sets for material (B) includes the values 50, 250, and 500 mm/sec, which fall within the numerical range of 50-500 mm/sec. As described above, the material (B) of the foil Mf has moderate light absorptivity (greater than 0.1 and less than 0.3) at the wavelength of the pulsed laser L. In other words, the information associated with the generating condition sets for material (B) in the recommended conditions database falls within the numerical range identified according to the experimental results in FIG. 10B. Accordingly, this information was found to be equivalent to the scanning speed of the pulsed laser L recommended for obtaining good machining quality.

The experimental results shown in the lower part of FIG. 10C indicate visual evaluations of machining results produced in ceramic marking processes using a foil Mf formed of the prescribed material having light absorptivity greater than 0.1 and less than 0.3 while varying the scanning number of times performed with the pulsed laser L. Note that while the scanning number of times of the pulsed laser L was varied in five steps, the other experimental marking conditions were fixed at prescribed values, such as output intensity of 4 W and scanning speed of 50 mm/sec for the pulsed laser L.

As shown in the experimental results of FIG. 10C, a visual evaluation of ○ was determined for scanning numbers of times of 1, 2, and 3, a visual evaluation of Δ was determined for a scanning number of times of 4, and a visual evaluation of X was determined for a scanning number of times of 5. Thus, when a foil Mf formed of the prescribed material having light absorptivity greater than 0.1 and less than 0.3 is used in the ceramic marking processes and the scanning number of times of the pulsed laser L is the marking condition being evaluated, the numerical range of the marking condition recommended for obtaining good machining results was identified to be 1-3 on the basis of the experimental results in FIG. 10C.

In the recommended conditions database shown in FIG. 7, on the other hand, the information on the scanning numbers of times of the pulsed laser L associated with generating condition sets for material (B) includes the values 1, 2, and 3, which fall within the numerical range of 1-3. As described above, the material (B) of the foil Mf has moderate light absorptivity (greater than 0.1 and less than 0.3) at the wavelength of the pulsed laser L. In other words, the information associated with the generating condition sets for material (B) in the recommended conditions database falls within the numerical range identified according to the experimental results in FIG. 10C. Accordingly, this information was found to be equivalent to the scanning numbers of times of the pulsed laser L recommended for obtaining good machining quality.

(Effects of Marking Conditions when Using Foil Configured of High Light-Absorbing Material)

Next, the effects of each marking condition on machining results of a ceramic marking process using a foil Mf formed of high light-absorbing material will be verified while referring to FIGS. 11A through 11C. In the present embodiment, the high light-absorbing material denotes material having light absorptivity equal to or greater than 0.3. Material (C) can be used as an example of such high light-absorbing material. In the experiments shown in FIGS. 11A through 11C, ceramic marking processes were performed using a foil Mf formed of material having light absorptivity equal to or greater than 0.3 to verify the effects of the output intensity, scanning speed, and scanning number of times of the pulsed laser L on machining quality.

The experimental results shown in the lower part of FIG. 11A indicate visual evaluations of machining results produced in ceramic marking processes using a foil Mf formed of the prescribed material having light absorptivity equal to or greater than 0.3 while varying the output intensity of the pulsed laser L. Note that while the output intensity of the pulsed laser L was varied in six steps, the other experimental marking conditions were fixed at prescribed values, such as scanning speed of 1000 mm/sec and a scanning number of times of 1 for the pulsed laser L.

As shown in the experimental results of FIG. 11A, a visual evaluation of ○ was determined for output intensity of 2, 1, and 0.5 W, and a visual evaluation of X was determined for output intensity of 5, 4, and 3 W. Thus, when a foil Mf formed of the prescribed material with light absorptivity equal to or greater than 0.3 is used in the ceramic marking processes and the output intensity of the pulsed laser L is the marking condition being evaluated, the numerical range of the marking condition recommended for obtaining good machining results was identified to be 0.5-2 W on the basis of the experimental results in FIG. 11A.

In the recommended conditions database shown in FIG. 7, on the other hand, the information on the output intensity of the pulsed laser L associated with generating condition sets for material (C) includes the values 0.5, 1.0, and 2.0 W, which fall within the numerical range of 0.5-2 W. As described above, the material (C) of the foil Mf has high light absorptivity (equal to or greater than 0.3) at the wavelength of the pulsed laser L. In other words, the information associated with the generating condition sets for material (C) in the recommended conditions database falls within the numerical range identified according to the experimental results in FIG. 11A. Accordingly, this information was found to be equivalent to the output intensity of the pulsed laser L recommended for obtaining good machining quality.

The experimental results shown in the lower part of FIG. 11B indicate visual evaluations of machining results produced in ceramic marking processes using a foil Mf formed of the prescribed material having light absorptivity equal to or greater than 0.3 while varying the scanning speed of the pulsed laser L. Note that while the scanning speed of the pulsed laser L was varied in seven steps, the other experimental marking conditions were fixed at prescribed values, such as output intensity of 1 W and a scanning number of times of 1 for the pulsed laser L.

As shown in the experimental results of FIG. 11B, a visual evaluation of ○ was determined for scanning speed of 100, 200, 500, and 1000 mm/sec, a visual evaluation of Δ was determined for scanning speed of 1500 mm/sec and a visual evaluation of X was determined for scanning speed of 50 and 2000 mm/sec. Thus, when a foil Mf formed of the prescribed material having light absorptivity equal to or greater than 0.3 is used in the ceramic marking processes and the scanning speed of the pulsed laser L is the marking condition being evaluated, the numerical range of the marking condition recommended for obtaining good machining results was identified to be 100-1000 mm/sec on the basis of the experimental results in FIG. 11B.

In the recommended conditions database shown in FIG. 7, on the other hand, the information on the scanning speed of the pulsed laser L associated with generating condition sets for material (C) includes the values 200, 500, and 1000 mm/sec, which fall within the numerical range of 100-1000 mm/sec. As described above, the material (C) of the foil Mf has high light absorptivity (equal to or greater than 0.3) at the wavelength of the pulsed laser L. In other words, the information associated with the generating condition sets for material (C) in the recommended conditions database falls within the numerical range identified according to the experimental results in FIG. 11B. Accordingly, this information was found to be equivalent to the scanning speed of the pulsed laser L recommended for obtaining good machining quality.

The experimental results shown in the lower part of FIG. 11C indicate visual evaluations of machining results produced in ceramic marking processes using a foil Mf of the prescribed material having light absorptivity equal to or greater than 0.3 while varying the scanning number of times performed with the pulsed laser L. Note that while the scanning number of times of the pulsed laser L was varied in four steps, the other experimental marking conditions were fixed at prescribed values, such as output intensity of 1 W and scanning speed of 1000 mm/sec for the pulsed laser L.

As shown in the experimental results of FIG. 11C, a visual evaluation of ○ was determined for scanning numbers of times of 1, 2, and 3, and a visual evaluation of X was determined for a scanning number of times of 4. Thus, when a foil Mf formed of the prescribed material having light absorptivity equal to or greater than 0.3 is used in the ceramic machining processes and the scanning number of times of the pulsed laser L is the marking condition being evaluated, the numerical range of the marking condition recommended for obtaining good machining results was identified to be 1-3 on the basis of the experimental results in FIG. 11C.

In the recommended conditions database shown in FIG. 7, on the other hand, the information on the scanning numbers of times of the pulsed laser L associated with generating condition sets for material (C) includes the values 1, 2, and 3, which fall within the numerical range of 1-3. As described above, the material (C) of the foil Mf has high light absorptivity (equal to or greater than 0.3) at the wavelength of the pulsed laser L. In other words, the information associated with the generating condition sets for material (C) in the recommended conditions database falls within the numerical range identified according to the experimental results in FIG. 11C. Accordingly, this information was found to be equivalent to the scanning numbers of times of the pulsed laser L recommended for obtaining good machining quality.

As described above with reference to FIGS. 7 through 11C, the recommended conditions database associates recommended marking conditions (the output intensity, scanning speed, and scanning number of times of the pulsed laser L, for example) verified through experimentation with the light absorptivity of foils Mf. Accordingly, in the recommended marking conditions identifying process (S3 of FIG. 5), the data generating device 7 and the like can reference the recommended conditions database to identify recommended marking conditions suited to the light absorptivity of the foil Mf and can generate machining data for performing a ceramic marking process suited to the light absorptivity of the foil Mf.

As described above, the data generating device 7, the machining data generating program, and the method executed by the data generating device 7 for generating machining data according to the present embodiment (hereinafter abbreviated as "the data generating device 7 and the like") can identify recommended marking conditions corresponding to the composition (material and thickness) of a foil Mf according to foil information including the material and thickness of the foil Mf received through the generating conditions setting section 81 of the marking parameters window 80 and the recommended conditions database stored on the HDD 75 (S3), and generate machining data for ceramic marking process (S7).

The marking conditions included in the machining data include the output intensity of the pulsed laser L, the scanning speed of the pulsed laser L during machining, the scanning number of times of the pulsed laser L for machining, the frequency of the pulsed laser L, and the pulse width of the pulsed laser L. The data generating device 7 and the like can identify these marking conditions from content associated with generating conditions that include the foil information received through the generating conditions setting section 81 (S3). Thus, through more simple user operations, the data generating device 7 can generate the machining data for the ceramic marking process that includes the identified marking conditions corresponding to the composition of the foil Mf. This machining data can improve the machining quality in the ceramic marking process described in FIGS. 4A and 4B by controlling the operations of the laser machining device 1, wherein the metal foil Mf is placed on the surface of the workpiece W, and the surface of the workpiece W is machined by irradiating the pulsed laser L emitted from the laser machining device 1 toward the surface of the workpiece W on which the foil Mf is placed.

In the recommended conditions database shown in FIG. 7, recommended marking conditions within prescribed numerical ranges are associated with the material of the foil Mf (material (A), material (B), material (C), etc.) and the light absorptivity of the foil Mf identified depending on the material of the foil Mf. Hence, in the recommended marking conditions identifying process (S3), the CPU 71 can identify the marking conditions associated with information received through the foil material setting element 82 (i.e., the material and light absorptivity of the foil Mf).

The light absorptivity of the foil Mf at the wavelength of the pulsed laser L affects heat input of the pulsed laser L to the foil Mf and workpiece W, which in turn influences the machining quality in the ceramic marking process. Accordingly, the data generating device 7 and the like reference the recommended conditions database to identify recommended marking conditions associated with the light absorptivity of the foil Mf. In this way, through simple user operations, the data generating device 7 can generate the machining data for the ceramic marking process that includes recommended marking conditions corresponding to the light absorptivity of the foil Mf. Since the operations of the laser machining device 1 are controlled according to this machining data, the machining quality of the ceramic marking process can be improved.

As shown in FIGS. 7 and 9A through 9C, the recommended conditions database associates information on recommended marking conditions including the output intensity, scanning speed, and scanning number of times of the pulsed laser L with generating condition sets for material (A). The material (A) indicates a foil Mf having low light absorptivity (equal to or less than 0.1) at the wavelength of the pulsed laser L. The information on the output intensity of the pulsed laser L associated with the generating condition sets for the material (A) in the database indicates the values 5.0, 10.0, and 15.0 W, which fall within the numerical range of 4.6-20 W (see FIGS. 7 and 9A). The information on the scanning speed of the pulsed laser L associated with the generating condition sets for the material (A) indicates the values 10, 100, and 200 mm/sec, which fall within the numerical range of 10-200 mm/sec (see FIGS. 7 and 9B). The information on the scanning number of times of the pulsed laser L associated with the generating condition sets for the material (A) indicates the values 2, 4, and 5, which fall within the numerical range of 2-5 (see FIGS. 7 and 9C).

Accordingly, in the recommended marking conditions identifying process of S3 the data generating device 7 and the like can identify, from the recommended conditions database, the recommended marking conditions from that are suitable for the ceramic marking process using a foil Mf with light absorptivity equal to or less than 0.1. Thus, the data generating device 7 and the like can generate the machining data capable of performing a ceramic marking process suited to the light absorptivity of the foil Mf.

As shown in FIGS. 7 and 10A through 10C, the recommended conditions database similarly associates information on the recommended marking conditions with generating condition sets for a material (B). The material (B) indicates a foil Mf having moderate light absorptivity (greater than 0.1 and less than 0.3) at the wavelength of the pulsed laser L. The information on the output intensity associated with the generating condition sets for the material (B) in the recommended conditions database indicate the values 2.0, 3.5, and 5.0 W, which fall within the numerical range 2-5 W (see FIGS. 7 and 10A). The information on the scanning speed associated with the generating condition sets for the material (B) indicate the values 50, 250, and 500 mm/sec, which fall within the numerical range of 50-500 mm/sec (see FIGS. 7 and 10B). The information on the scanning number of times associated with the generating condition sets for the material (B) indicate the values 1, 2, and 3, which fall within the numerical range 1-3 (see FIGS. 7 and 10C).

Accordingly, in the recommended marking conditions identifying process of S3 the data generating device 7 and the like can identify, from the recommended conditions database, the recommended marking conditions that are suitable for the ceramic marking process using a foil Mf having light absorptivity greater than 0.1 and less than 0.3. Thus, the data generating device 7 and the like can generate the machining data capable of performing a ceramic marking process suited to the light absorptivity of the foil Mf.

As shown in FIGS. 7 and 11A through 11C, the recommended conditions database similarly associates information on recommended marking conditions with generating condition sets for material (C). The material (C) indicates a foil Mf having high light absorptivity (equal to or greater than 0.3) at the wavelength of the pulsed laser L. The information on the output intensity associated with the generating condition sets for the material (C) in the recommended conditions database indicates the values 0.5, 1.0, and 2.0 W, which fall within the numerical range 0.5-2 W (see FIGS. 7 and 11A). The information on the scanning speed associated with the generating condition sets for the material (C) in the recommended conditions database indicates the values 200, 500, and 1000 mm/sec, which fall within the numerical range of 100-1000 mm/sec (see FIGS.

7 and 11B). The information on the scanning number of times associated with the generating condition sets for the material (C) in the recommended conditions database indicates the values 1, 2, and 3, which fall within the numerical range of 1-3 (see FIGS. 7 and 11C).

Accordingly, in the recommended marking conditions identifying process of S3 the data generating device 7 and the like can identify, from the recommended conditions database, the recommended marking conditions that are suitable for the ceramic marking process using a foil Mf having light absorptivity equals to or greater than 0.3. Thus, the data generating device 7 and the like can generate the machining data capable of performing a ceramic marking process suited to the light absorptivity of the foil Mf.

As shown in FIG. 7, the information in the recommended conditions database is associated so as to indicate a larger value for the output intensity of the pulsed laser L as the thickness of the foil Mf received through the foil thickness setting element 83 is greater. Therefore, in the recommended marking conditions identifying process of S3 the CPU 71 can identify the recommended marking condition for the output intensity to be a larger value within the numerical range identified according to the information received through the foil material setting element 82 (the material and light absorptivity of the foil Mf) as the thickness of the foil Mf received through the foil thickness setting element 83 is greater.

Here, the thickness of the foil Mf affects the heat input of the pulsed laser L to the foil Mf and workpiece W, which in turn influences the machining quality in the ceramic marking process. Accordingly, through simple operations by the user, the data generating device 7 and the like can generate the machining data for the ceramic marking process that includes the recommended marking conditions corresponding to the thickness of the foil Mf. This machining data can then improve the machining quality in the ceramic marking process by controlling the operations of the laser machining device 1.

The information in the recommended conditions database also associates different values for the scanning speed of the pulsed laser L with the information on differing machining qualities (fine, balanced, and fast in FIG. 7) received as one of the generating conditions. That is, a smaller value for the scanning speed is associated with a higher machining quality (i.e., "fine"; see FIG. 7). Accordingly, in the recommended marking conditions identifying process of S3 the CPU 71 can identify, corresponding to the machining quality received through the machining quality setting element 84, a more suitable recommended marking condition for the scanning speed of the pulsed laser L within the numerical range identified according to the information received through the foil material setting element 82 (i.e., the material and light absorptivity of the foil Mf).

Here, the scanning speed of the pulsed laser L affects the heat input of the pulsed laser L per unit time to the foil Mf and workpiece W, which in turn influences the machining quality in the ceramic marking process. Accordingly, through simple operations by the user, the data generating device 7 and the like can generate the machining data for the ceramic marking process that includes the recommended marking conditions corresponding to the user-desired machining quality. This machining data can be used to control the operations of the laser machining device 1 to produce the desired machining quality in the ceramic marking process.

In the present embodiment described above, the data generating device 7 is an example of the data generating device in the present disclosure. The laser machining device 1 is an example of the laser machining device in the disclosure, and the HDD 75 is an example of the storage in the disclosure. Further, the control unit 70, CPU 71, input operation unit 76, LCD 77, marking parameters window 80, and generating conditions setting section 81 are examples of the controller in the disclosure. Furthermore, the workpiece W is an example of the workpiece in the disclosure, and the foil Mf is an example of the foil in the disclosure. The pulsed laser L is an example of the laser beam in the disclosure.

While the description has been made in detail with reference to the specific embodiment, it would be apparent to those skilled in the art that many modifications and variations may be made thereto. For example, in the embodiment described above, a ceramic marking process is given as an example of a marking process using a foil Mf, and ceramic material is used as constituent material of a workpiece W used in a ceramic marking mode, but the present disclosure is not limited to this configuration. Various materials may be used as the constituent material of the workpiece W in the marking process employing the foil Mf, provided that the material has low energy absorptivity at the wavelength of the pulsed laser L. For example, porcelain and heat-resistant plastic are possible constituent materials for the workpiece W.

In the recommended conditions database of the embodiment described above, the information on the output intensity of the pulsed laser L associated with the generating condition sets for material (A) having low light absorptivity (equal to or less than 0.1) at the wavelength of the pulsed laser L specifies the values 5.0, 10.0, and 15.0 W, which fall within the numerical range of 4.6-20 W. However, the information on the output intensity in the database may specify other values within the numerical range 4.6-20 W.

Further, in the recommended conditions database of the embodiment, the information on the scanning speed of the pulsed laser L associated with the generating condition sets for material (C) having high light absorptivity (equal to or greater than 0.3) at the wavelength of the pulsed laser L specifies the values 200, 500, and 1000 mm/sec, which fall within the numerical range of 100-1000 mm/sec. However, the information on the scanning speed in the database may specify other values within the numerical range 100-1000 mm/sec.

The information in the recommended conditions database may be configured to specify larger scanning speed for the pulsed laser L when the thickness of the foil Mf in the generating conditions (foil information) is smaller. In this case, in the recommended marking conditions identification process of S3 the CPU 71 can identify the recommended marking condition for the scanning speed of the pulsed laser L to be a larger value within the numerical range identified according to the information received through the foil material setting element 82 (i.e., the material and light absorptivity of the foil Mf) as the thickness of the foil Mf received through the foil thickness setting element 83 is smaller.

Here, the thickness of the foil Mf affects the heat input of the pulsed laser L to the foil Mf and workpiece W, and the scanning speed of the pulsed laser L affects the heat input of the pulsed laser L per unit time to the foil Mf and workpiece W and, therefore, has a great influence on the machining quality in the ceramic marking process. With this configuration, the data generating device 7 can generate the machining data that includes the scanning speed of the pulsed laser L as the recommended marking condition corresponding to the thickness of the foil Mf through a simple user operation. This machining data can then improve the machining quality in the ceramic marking process by controlling the operations of the laser machining device 1.

What is claimed is:

1. A data generating device for generating machining data to control irradiation of a laser beam from a laser machining device onto a surface of a workpiece on which a target foil to be subjected to the irradiation of the laser beam is placed, the target foil being made of metal, the machining data including a machining condition on the irradiation of the laser beam, the data generating device comprising:
a storage configured to store a plurality of sets of machining condition information in association with respective ones of a plurality of sets of foil information, each of the plurality of sets of machining condition information specifying a machining condition on the irradiation of the laser beam, the machining condition including at least one of output intensity of the laser beam, scanning speed of the laser beam, a scanning number of times of the laser beam, a frequency of the laser beam, and a pulse width of the laser beam, each of the plurality of sets of foil information specifying foil composition, the foil composition including material of the corresponding one of the plurality of foils and a thickness of the corresponding one of the plurality of foils; and
a controller configured to perform:
receiving input information specifying the foil composition of the target foil as one set of foil information; and
identifying one of the plurality of sets of machining condition information stored in the storage, the one of the plurality of sets of machining condition information corresponding to the one set of foil information.

2. The data generating device according to claim 1, wherein the material has light absorptivity,
wherein the input information includes information for specifying light absorptivity of the target foil, and
wherein the identifying identifies the one of the plurality of sets of machining condition information by identifying the one set of foil information in accordance with the input information.

3. The data generating device according to claim 2, wherein the plurality of sets of foil information includes a specific set of foil information, the specific set of foil information specifying the material having the light absorptivity equal to or less than 0.1, and
wherein the plurality of sets of machining condition information includes a specific set of machining condition information stored in association with the specific set of foil information in the storage, the specific set of machining condition information including the output intensity within an intensity range ranging from 4.6 W to 20 W, the scanning speed within a speed range ranging from 10 mm/sec to 200 mm/sec, and the scanning number of times ranging from two to five.

4. The data generating device according to claim 3, wherein the input information includes information specifying the thickness of the target foil, and
wherein the identifying identifies a numerical value of the output intensity within the intensity range in accordance with the thickness of the target foil, the numerical value being a larger value as the thickness of the target foil is greater.

5. The data generating device according to claim 3, wherein the input information includes information indicating machining quality, and
wherein the identifying identifies a numerical value of the scanning speed within the speed range in accordance with the machining quality.

6. The data generating device according to claim 3, wherein the input information includes information specifying the thickness of the target foil, and
wherein the identifying identifies a numerical value of the scanning speed within the speed range in accordance with the thickness of the target foil, the numerical value being larger value as the thickness of the target foil is smaller.

7. The data generating device according to claim 2, wherein the plurality of sets of foil information includes a specific set of foil information, the specific set of foil information specifying the material of the foil having the light absorptivity greater than 0.1 and less than 0.3, and
wherein the plurality of sets of machining condition information includes a specific set of machining condition information stored in association with the specific set of foil information in the storage, the specific set of machining condition information including the output intensity within an intensity range ranging from 2 W to 5 W, the scanning speed within a speed range ranging from 50 mm/sec to 500 mm/sec, and the scanning number of times ranging from one to three.

8. The data generating device according to claim 7, wherein the input information includes information specifying the thickness of the target foil, and
wherein the identifying identifies a numerical value of the output intensity within the intensity range in accordance with the thickness of the target foil, the numerical value being a larger value as the thickness of the target foil is greater.

9. The data generating device according to claim 7, wherein the input information includes information indicating machining quality, and
wherein the identifying identifies a numerical value of the scanning speed within the speed range in accordance with the machining quality.

10. The data generating device according to claim 7, wherein the input information includes information specifying the thickness of the target foil, and
wherein the identifying identifies a numerical value of the scanning speed within the speed range in accordance with the thickness of the target foil, the numerical value being larger value as the thickness of the target foil is smaller.

11. The data generating device according to claim 2, wherein the plurality of sets of foil information includes a specific set of foil information, the specific set of foil information specifying the material of the foil having the light absorptivity equal to or greater than 0.3, and
wherein the plurality of sets of machining condition information includes a specific set of machining condition information stored in association with the specific set of foil information in the storage, the specific set of machining condition information including the output intensity within an intensity range ranging from 0.5 W to 2 W, the scanning speed within a speed range ranging from 100 mm/sec to 1000 mm/sec, and the scanning number of times ranging from one to three.

12. The data generating device according to claim 11, wherein the input information includes information specifying the thickness of the target foil, and
wherein the identifying identifies a numerical value of the output intensity within the intensity range in accordance with the thickness of the target foil, the numerical value being a larger value as the thickness of the target foil is greater.

13. The data generating device according to claim 11, wherein the input information includes information indicating machining quality, and
wherein the identifying identifies a numerical value of the scanning speed within the speed range in accordance with the machining quality.

14. The data generating device according to claim 11, wherein the input information includes information specifying the thickness of the target foil, and
wherein the identifying identifies a numerical value of the scanning speed within the speed range in accordance with the thickness of the target foil, the numerical value being larger value as the thickness of the target foil is smaller.

15. A non-transitory computer readable storage medium storing a set of program instructions for a data generating device for generating machining data to control irradiation of a laser beam from a laser machining device onto a surface of a workpiece on which a target foil to be subjected to the irradiation of the laser beam is placed, the target foil being made of metal, the machining data including a machining condition on the irradiation of the laser beam, the data generating device including: a storage configured to store a plurality of sets of machining condition information in association with respective ones of a plurality of sets of foil information, each of the plurality of sets of machining condition information specifying a machining condition on the irradiation of the laser beam, the machining condition including at least one of output intensity of the laser beam, scanning speed of the laser beam, a scanning number of times of the laser beam, a frequency of the laser beam, and a pulse width of the laser beam, each of the plurality of sets of foil information specifying foil composition of a corresponding one of a plurality of foils, the foil composition including material of the corresponding one of the plurality of foils and a thickness of the corresponding one of the plurality of foils; and a controller, the set of program instructions, when executed by the controller, causing the data generating device to perform:
receiving input information specifying the foil composition of the target foil as one set of foil information; and
identifying one of the plurality of sets of machining condition information stored in the storage, the one of the plurality of sets of machining condition information corresponding to the one set of foil information.

16. A method executed by a data generating device for generating machining data to control irradiation of a laser beam from a laser machining device onto a surface of a workpiece on which a target foil to be subjected to the irradiation of the laser beam is placed, the target foil being made of metal, the machining data including a machining condition on the irradiation of the laser beam, the data generating device including: a storage configured to store a plurality of sets of machining condition information in association with respective ones of a plurality of sets of foil information, each of the plurality of sets of machining condition information specifying a machining condition on the irradiation of the laser beam, the machining condition including at least one of output intensity of the laser beam, scanning speed of the laser beam, a scanning number of times of the laser beam, a frequency of the laser beam, and a pulse width of the laser beam, each of the plurality of sets of foil information specifying foil composition of a corresponding one of a plurality of foils, the foil composition including material of the corresponding one of the plurality of foils and a thickness of the corresponding one of the plurality of foils; and a controller, the method comprising:
receiving input information specifying the foil composition of the target foil as one set of foil information; and
identifying one of the plurality of sets of machining condition information stored in the storage, the one of the plurality of sets of machining condition information corresponding to the one set of foil information.

* * * * *